United States Patent
Simpson

(10) Patent No.: US 10,046,389 B2
(45) Date of Patent: Aug. 14, 2018

(54) METHOD AND ASSEMBLY FOR FORMING COMPONENTS HAVING INTERNAL PASSAGES USING A JACKETED CORE

(71) Applicant: General Electric Company, Schenectady, NY (US)

(72) Inventor: Stanley Frank Simpson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 276 days.

(21) Appl. No.: 14/972,805

(22) Filed: Dec. 17, 2015

(65) Prior Publication Data
US 2017/0173682 A1  Jun. 22, 2017

(51) Int. Cl.
*B22D 19/00* (2006.01)
*B22D 25/02* (2006.01)
(Continued)

(52) U.S. Cl.
CPC ............... *B22D 25/02* (2013.01); *B22C 3/00* (2013.01); *B22C 9/10* (2013.01); *B22C 9/108* (2013.01);
(Continued)

(58) Field of Classification Search
CPC .... B22C 1/00; B22C 3/00; B22C 9/10; B22C 9/101; B22C 9/108; B22C 9/12;
(Continued)

(56) References Cited

U.S. PATENT DOCUMENTS 2,687,278 A   8/1954 Smith et al.
2,756,475 A   7/1956 Hanink et al.
(Continued)

FOREIGN PATENT DOCUMENTS

CH   640440 A5   1/1984
EP   0025481 A1   3/1981
(Continued)

OTHER PUBLICATIONS

Ziegelheim, J. et al., "Diffusion bondability of similar/dissimilar light metal sheets," Journal of Materials Processing Technology 186.1 (May 2007): 87-93.
(Continued)

*Primary Examiner* — Kevin P Kerns
(74) *Attorney, Agent, or Firm* — Armstrong Teasdale LLP

(57) ABSTRACT

A method of forming a component having an internal passage defined therein includes forming a precursor core having a shape corresponding to a shape of the internal passage, and forming a hollow structure around the precursor core. The method also includes removing the precursor core from within the hollow structure, and disposing an inner core within the hollow structure to form a jacketed core. The method further includes positioning the jacketed core with respect to a mold, and introducing a component material in a molten state into a cavity of the mold, such that the component material in the molten state at least partially absorbs the hollow structure from a portion of the jacketed core within the cavity. Additionally, the method includes cooling the component material in the cavity to form the component. The inner core defines the internal passage within the component.

22 Claims, 10 Drawing Sheets

(51) Int. Cl.

| | | |
|---|---|---|
| *B22D 29/00* | (2006.01) | |
| *B22C 9/10* | (2006.01) | |
| *B22C 9/24* | (2006.01) | |
| *B33Y 10/00* | (2015.01) | |
| *B33Y 70/00* | (2015.01) | |
| *B33Y 80/00* | (2015.01) | |
| *B22C 3/00* | (2006.01) | |
| *B22C 9/12* | (2006.01) | |
| *B22D 21/00* | (2006.01) | |
| *C25D 3/12* | (2006.01) | |
| *C25D 5/14* | (2006.01) | |
| *C25D 5/56* | (2006.01) | |
| *C25D 7/04* | (2006.01) | |
| *C23C 18/31* | (2006.01) | |
| *F01D 5/18* | (2006.01) | |
| *F01D 9/02* | (2006.01) | |
| *F01D 25/12* | (2006.01) | |
| *F04D 29/32* | (2006.01) | |
| *F04D 29/54* | (2006.01) | |
| *F04D 29/58* | (2006.01) | |

(52) U.S. Cl.
CPC .............. *B22C 9/12* (2013.01); *B22C 9/24* (2013.01); *B22D 19/0054* (2013.01); *B22D 19/0072* (2013.01); *B22D 21/005* (2013.01); *B22D 29/001* (2013.01); *B22D 29/002* (2013.01); *B33Y 10/00* (2014.12); *B33Y 70/00* (2014.12); *B33Y 80/00* (2014.12); *C25D 3/12* (2013.01); *C25D 5/14* (2013.01); *C25D 5/56* (2013.01); *C25D 7/04* (2013.01); *C23C 18/31* (2013.01); *F01D 5/18* (2013.01); *F01D 9/02* (2013.01); *F01D 25/12* (2013.01); *F04D 29/324* (2013.01); *F04D 29/542* (2013.01); *F04D 29/582* (2013.01); *F05D 2220/32* (2013.01); *F05D 2230/211* (2013.01)

(58) Field of Classification Search
CPC ...... B22C 9/24; B22D 19/00; B22D 19/0054; B22D 19/0072; B22D 21/022; B22D 21/025; B22D 25/02; B22D 29/001; B33Y 10/00
USPC .............. 164/14, 33, 91, 132, 137, 365, 369
See application file for complete search history.

(56) References Cited

U.S. PATENT DOCUMENTS

| | | |
|---|---|---|
| 2,991,520 A | 7/1961 | Dalton |
| 3,160,931 A * | 12/1964 | Leach ............... B22C 1/205 164/525 |
| 3,222,435 A | 12/1965 | Mellen, Jr. et al. |
| 3,222,737 A | 12/1965 | Reuter |
| 3,475,375 A | 10/1969 | Yates |
| 3,563,711 A | 2/1971 | Hammond et al. |
| 3,596,703 A | 8/1971 | Bishop et al. |
| 3,597,248 A | 8/1971 | Yates |
| 3,662,816 A | 5/1972 | Bishop et al. |
| 3,678,987 A | 7/1972 | Kydd |
| 3,689,986 A | 9/1972 | Takahashi et al. |
| 3,694,264 A | 9/1972 | Weinland et al. |
| 3,773,506 A | 11/1973 | Larker et al. |
| 3,824,113 A | 7/1974 | Loxley et al. |
| 3,844,727 A | 10/1974 | Copley et al. |
| 3,863,701 A | 2/1975 | Niimi et al. |
| 3,866,448 A | 2/1975 | Dennis et al. |
| 3,921,271 A | 11/1975 | Dennis et al. |
| 3,996,048 A | 12/1976 | Fiedler |
| 4,096,296 A | 6/1978 | Galmiche et al. |
| 4,130,157 A | 12/1978 | Miller et al. |
| 4,148,352 A | 4/1979 | Sensui et al. |
| 4,236,568 A | 12/1980 | Larson |
| 4,285,634 A | 8/1981 | Rossman et al. |
| 4,352,390 A | 10/1982 | Larson |
| 4,372,404 A | 2/1983 | Drake |
| 4,375,233 A | 3/1983 | Rossmann et al. |
| 4,417,381 A | 11/1983 | Higginbotham |
| 4,432,798 A | 2/1984 | Helferich et al. |
| 4,557,691 A | 12/1985 | Martin et al. |
| 4,576,219 A | 3/1986 | Uram |
| 4,583,581 A | 4/1986 | Ferguson et al. |
| 4,604,780 A | 8/1986 | Metcalfe |
| 4,637,449 A | 1/1987 | Mills et al. |
| 4,738,587 A | 4/1988 | Kildea |
| 4,859,141 A | 8/1989 | Maisch et al. |
| 4,905,750 A | 3/1990 | Wolf |
| 4,911,990 A | 3/1990 | Prewo et al. |
| 4,964,148 A | 10/1990 | Klostermann et al. |
| 4,986,333 A | 1/1991 | Gartland |
| 5,052,463 A | 10/1991 | Lechner et al. |
| 5,083,371 A | 1/1992 | Leibfried et al. |
| 5,243,759 A | 9/1993 | Brown et al. |
| 5,248,869 A | 9/1993 | DeBell et al. |
| 5,273,104 A | 12/1993 | Renaud |
| 5,291,654 A | 3/1994 | Judd et al. |
| 5,295,530 A | 3/1994 | O'Connor et al. |
| 5,332,023 A | 7/1994 | Mills |
| 5,350,002 A | 9/1994 | Orton |
| 5,355,668 A | 10/1994 | Weil et al. |
| 5,371,945 A | 12/1994 | Schnoor |
| 5,387,280 A | 2/1995 | Kennerknecht |
| 5,394,932 A | 3/1995 | Carozza et al. |
| 5,398,746 A | 3/1995 | Igarashi |
| 5,413,463 A | 5/1995 | Chin et al. |
| 5,465,780 A | 11/1995 | Muntner et al. |
| 5,467,528 A | 11/1995 | Bales et al. |
| 5,468,285 A | 11/1995 | Kennerknecht |
| 5,482,054 A | 1/1996 | Slater et al. |
| 5,498,132 A | 3/1996 | Carozza et al. |
| 5,505,250 A | 4/1996 | Jago |
| 5,507,336 A | 4/1996 | Tobin |
| 5,509,659 A | 4/1996 | Igarashi |
| 5,524,695 A | 6/1996 | Schwartz |
| 5,569,320 A | 10/1996 | Sasaki et al. |
| 5,611,848 A | 3/1997 | Sasaki et al. |
| 5,664,628 A | 9/1997 | Koehler et al. |
| 5,679,270 A | 10/1997 | Thornton et al. |
| 5,738,493 A | 4/1998 | Lee et al. |
| 5,778,963 A | 7/1998 | Parille et al. |
| 5,810,552 A | 9/1998 | Frasier |
| 5,820,774 A | 10/1998 | Dietrich |
| 5,909,773 A | 6/1999 | Koehler et al. |
| 5,924,483 A | 7/1999 | Frasier |
| 5,927,373 A | 7/1999 | Tobin |
| 5,947,181 A | 9/1999 | Davis |
| 5,951,256 A | 9/1999 | Dietrich |
| 5,976,457 A | 11/1999 | Amaya et al. |
| 6,029,736 A | 2/2000 | Naik et al. |
| 6,039,763 A | 3/2000 | Shelokov |
| 6,041,679 A | 3/2000 | Slater et al. |
| 6,068,806 A | 5/2000 | Dietrich |
| 6,186,741 B1 | 2/2001 | Webb et al. |
| 6,221,289 B1 | 4/2001 | Corbett et al. |
| 6,234,753 B1 | 5/2001 | Lee |
| 6,244,327 B1 | 6/2001 | Frasier |
| 6,251,526 B1 | 6/2001 | Staub |
| 6,327,943 B1 | 12/2001 | Wrigley et al. |
| 6,359,254 B1 | 3/2002 | Brown |
| 6,441,341 B1 | 8/2002 | Steibel et al. |
| 6,467,534 B1 | 10/2002 | Klug et al. |
| 6,474,348 B1 | 11/2002 | Beggs et al. |
| 6,505,678 B2 | 1/2003 | Mertins |
| 6,557,621 B1 | 5/2003 | Dierksmeier et al. |
| 6,578,623 B2 | 6/2003 | Keller et al. |
| 6,605,293 B1 | 8/2003 | Giordano et al. |
| 6,615,470 B2 | 9/2003 | Corderman et al. |
| 6,623,521 B2 | 9/2003 | Steinke et al. |
| 6,626,230 B1 | 9/2003 | Woodrum et al. |
| 6,634,858 B2 | 10/2003 | Roeloffs et al. |
| 6,637,500 B2 | 10/2003 | Shah et al. |

(56) References Cited

U.S. PATENT DOCUMENTS

| | | |
|---|---|---|
| 6,644,921 B2 | 11/2003 | Bunker et al. |
| 6,670,026 B2 | 12/2003 | Steibel et al. |
| 6,694,731 B2 | 2/2004 | Kamen et al. |
| 6,773,231 B2 | 8/2004 | Bunker et al. |
| 6,799,627 B2 | 10/2004 | Ray et al. |
| 6,800,234 B2 | 10/2004 | Ferguson et al. |
| 6,817,379 B2 | 11/2004 | Perla |
| 6,837,417 B2 | 1/2005 | Srinivasan |
| 6,896,036 B2 | 5/2005 | Schneiders et al. |
| 6,913,064 B2 | 7/2005 | Beals et al. |
| 6,929,054 B2 | 8/2005 | Beals et al. |
| 6,955,522 B2 | 10/2005 | Cunha et al. |
| 6,986,381 B2 | 1/2006 | Ray et al. |
| 7,028,747 B2 | 4/2006 | Widrig et al. |
| 7,036,556 B2 | 5/2006 | Caputo et al. |
| 7,052,710 B2 | 5/2006 | Giordano et al. |
| 7,073,561 B1 | 7/2006 | Henn |
| 7,093,645 B2 | 8/2006 | Grunstra et al. |
| 7,108,045 B2 | 9/2006 | Wiedemer et al. |
| 7,109,822 B2 | 9/2006 | Perkins et al. |
| 7,174,945 B2 | 2/2007 | Beals et al. |
| 7,185,695 B1 | 3/2007 | Santeler |
| 7,207,375 B2 | 4/2007 | Turkington et al. |
| 7,234,506 B2 | 6/2007 | Grunstra et al. |
| 7,237,375 B2 | 7/2007 | Humcke et al. |
| 7,237,595 B2 | 7/2007 | Beck et al. |
| 7,240,718 B2 | 7/2007 | Schmidt et al. |
| 7,243,700 B2 | 7/2007 | Beals et al. |
| 7,246,652 B2 | 7/2007 | Fowler |
| 7,270,170 B2 | 9/2007 | Beals et al. |
| 7,270,173 B2 | 9/2007 | Wiedemer et al. |
| 7,278,460 B2 | 10/2007 | Grunstra et al. |
| 7,278,463 B2 | 10/2007 | Snyder et al. |
| 7,306,026 B2 | 12/2007 | Memmen |
| 7,322,795 B2 | 1/2008 | Luczak et al. |
| 7,325,587 B2 | 2/2008 | Memmen |
| 7,334,625 B2 | 2/2008 | Judge et al. |
| 7,343,730 B2 | 3/2008 | Humcke et al. |
| 7,371,043 B2 | 5/2008 | Keller |
| 7,371,049 B2 | 5/2008 | Cunha et al. |
| 7,377,746 B2 | 5/2008 | Brassfield et al. |
| 7,410,342 B2 | 8/2008 | Matheny |
| 7,438,118 B2 | 10/2008 | Santeler |
| 7,448,433 B2 | 11/2008 | Ortiz et al. |
| 7,448,434 B2 | 11/2008 | Turkington et al. |
| 7,461,684 B2 | 12/2008 | Liu et al. |
| 7,478,994 B2 | 1/2009 | Cunha et al. |
| 7,517,225 B2 | 4/2009 | Cherian |
| 7,575,039 B2 | 8/2009 | Beals et al. |
| 7,588,069 B2 | 9/2009 | Munz et al. |
| 7,624,787 B2 | 12/2009 | Lee et al. |
| 7,625,172 B2 | 12/2009 | Walz et al. |
| 7,673,669 B2 | 3/2010 | Snyder et al. |
| 7,686,065 B2 | 3/2010 | Luczak |
| 7,713,029 B1 | 5/2010 | Davies |
| 7,717,676 B2 | 5/2010 | Cunha et al. |
| 7,722,327 B1 | 5/2010 | Liang |
| 7,802,613 B2 | 5/2010 | Bullied et al. |
| 7,727,495 B2 | 6/2010 | Burd et al. |
| 7,731,481 B2 | 6/2010 | Cunha et al. |
| 7,753,104 B2 | 7/2010 | Luczak et al. |
| 7,757,745 B2 | 7/2010 | Luczak |
| 7,771,210 B2 | 8/2010 | Cherian |
| 7,779,892 B2 | 8/2010 | Luczak et al. |
| 7,789,626 B1 | 9/2010 | Liang |
| 7,798,201 B2 | 9/2010 | Bewlay et al. |
| 7,806,681 B2 | 10/2010 | Fieck et al. |
| 7,861,766 B2 | 1/2011 | Bochiechio et al. |
| 7,882,884 B2 | 2/2011 | Beals et al. |
| 7,938,168 B2 | 5/2011 | Lee et al. |
| 7,947,233 B2 | 5/2011 | Burd et al. |
| 7,963,085 B2 | 6/2011 | Sypeck et al. |
| 7,993,106 B2 | 8/2011 | Walters |
| 8,057,183 B1 | 11/2011 | Liang |
| 8,066,483 B1 | 11/2011 | Liang |
| 8,100,165 B2 | 1/2012 | Piggush et al. |
| 8,113,780 B2 | 2/2012 | Cherolis et al. |
| 8,122,583 B2 | 2/2012 | Luczak et al. |
| 8,137,068 B2 | 3/2012 | Surace et al. |
| 8,162,609 B1 | 4/2012 | Liang |
| 8,167,537 B1 | 5/2012 | Plank et al. |
| 8,171,978 B2 | 5/2012 | Propheter-Hinckley et al. |
| 8,181,692 B2 | 5/2012 | Frasier et al. |
| 8,196,640 B1 | 6/2012 | Paulus et al. |
| 8,251,123 B2 | 8/2012 | Farris et al. |
| 8,251,660 B1 | 8/2012 | Liang |
| 8,261,810 B1 | 9/2012 | Liang |
| 8,291,963 B1 | 10/2012 | Trinks et al. |
| 8,297,455 B2 | 10/2012 | Smyth |
| 8,302,668 B1 | 11/2012 | Bullied et al. |
| 8,303,253 B1 | 11/2012 | Liang |
| 8,307,654 B1 | 11/2012 | Liang |
| 8,317,475 B1 | 11/2012 | Downs |
| 8,322,988 B1 | 12/2012 | Downs et al. |
| 8,336,606 B2 | 12/2012 | Piggush |
| 8,342,802 B1 | 1/2013 | Liang |
| 8,366,394 B1 | 2/2013 | Liang |
| 8,381,923 B2 | 2/2013 | Smyth |
| 8,414,263 B1 | 4/2013 | Liang |
| 8,500,401 B1 | 8/2013 | Liang |
| 8,506,256 B1 | 8/2013 | Brostmeyer et al. |
| 8,535,004 B2 | 9/2013 | Campbell |
| 8,622,113 B1 | 1/2014 | Rau, III |
| 8,678,766 B1 | 3/2014 | Liang |
| 8,734,108 B1 | 5/2014 | Liang |
| 8,753,083 B2 | 6/2014 | Lacy et al. |
| 8,770,931 B2 | 7/2014 | Alvanos et al. |
| 8,777,571 B1 | 7/2014 | Liang |
| 8,793,871 B2 | 8/2014 | Morrison et al. |
| 8,794,298 B2 | 8/2014 | Schlienger et al. |
| 8,807,943 B1 | 8/2014 | Liang |
| 8,813,812 B2 | 8/2014 | Ellgass et al. |
| 8,813,824 B2 | 8/2014 | Appleby et al. |
| 8,858,176 B1 | 10/2014 | Liang |
| 8,864,469 B1 | 10/2014 | Liang |
| 8,870,524 B1 | 10/2014 | Liang |
| 8,876,475 B1 | 11/2014 | Liang |
| 8,893,767 B2 | 11/2014 | Mueller et al. |
| 8,899,303 B2 | 12/2014 | Mueller et al. |
| 8,906,170 B2 | 12/2014 | Gigliotti, Jr. et al. |
| 8,911,208 B2 | 12/2014 | Propheter-Hinckley et al. |
| 8,915,289 B2 | 12/2014 | Mueller et al. |
| 8,936,068 B2 | 1/2015 | Lee et al. |
| 8,940,114 B2 | 1/2015 | James et al. |
| 8,969,760 B2 | 3/2015 | Hu et al. |
| 8,978,385 B2 | 3/2015 | Cunha |
| 8,993,923 B2 | 3/2015 | Hu et al. |
| 8,997,836 B2 | 4/2015 | Mueller et al. |
| 9,038,706 B2 | 5/2015 | Hillier |
| 9,051,838 B2 | 6/2015 | Wardle et al. |
| 9,057,277 B2 | 6/2015 | Appleby et al. |
| 9,057,523 B2 | 6/2015 | Cunha et al. |
| 9,061,350 B2 | 6/2015 | Bewlay et al. |
| 9,079,241 B2 | 7/2015 | Barber et al. |
| 9,079,803 B2 | 7/2015 | Xu |
| 9,174,271 B2 | 11/2015 | Newton et al. |
| 2001/0044651 A1 | 11/2001 | Steinke et al. |
| 2002/0029567 A1 | 3/2002 | Kamen et al. |
| 2002/0182056 A1 | 12/2002 | Widrig et al. |
| 2002/0187065 A1 | 12/2002 | Amaya et al. |
| 2002/0190039 A1 | 12/2002 | Steibel et al. |
| 2002/0197161 A1 | 12/2002 | Roeloffs et al. |
| 2003/0047197 A1 | 3/2003 | Beggs et al. |
| 2003/0062088 A1 | 4/2003 | Perla |
| 2003/0133799 A1 | 7/2003 | Widrig et al. |
| 2003/0150092 A1 | 8/2003 | Corderman et al. |
| 2003/0199969 A1 | 10/2003 | Steinke et al. |
| 2003/0201087 A1 | 10/2003 | Devine et al. |
| 2004/0024470 A1 | 2/2004 | Giordano et al. |
| 2004/0055725 A1 | 3/2004 | Ray et al. |
| 2004/0056079 A1 | 3/2004 | Srinivasan |
| 2004/0144089 A1 | 7/2004 | Kamen et al. |
| 2004/0154252 A1 | 8/2004 | Sypeck et al. |
| 2004/0159985 A1 | 8/2004 | Altoonian et al. |

(56) References Cited

U.S. PATENT DOCUMENTS

| | | |
|---|---|---|
| 2005/0006047 A1 | 1/2005 | Wang et al. |
| 2005/0016706 A1 | 1/2005 | Ray et al. |
| 2005/0087319 A1 | 4/2005 | Beals et al. |
| 2005/0133193 A1 | 6/2005 | Beals et al. |
| 2005/0247429 A1 | 11/2005 | Turkington et al. |
| 2006/0032604 A1 | 2/2006 | Beck et al. |
| 2006/0048553 A1 | 3/2006 | Almquist |
| 2006/0065383 A1 | 3/2006 | Ortiz et al. |
| 2006/0107668 A1 | 5/2006 | Cunha et al. |
| 2006/0118262 A1 | 6/2006 | Beals et al. |
| 2006/0118990 A1 | 6/2006 | Dierkes et al. |
| 2006/0237163 A1 | 10/2006 | Turkington et al. |
| 2006/0283168 A1 | 12/2006 | Humcke et al. |
| 2007/0044936 A1 | 3/2007 | Memmen |
| 2007/0059171 A1 | 3/2007 | Simms et al. |
| 2007/0107412 A1 | 5/2007 | Humcke et al. |
| 2007/0114001 A1 | 5/2007 | Snyder et al. |
| 2007/0116972 A1 | 5/2007 | Persky |
| 2007/0169605 A1 | 7/2007 | Szymanski |
| 2007/0177975 A1 | 8/2007 | Luczak et al. |
| 2007/0253816 A1 | 11/2007 | Walz et al. |
| 2008/0003849 A1 | 1/2008 | Cherian |
| 2008/0080979 A1 | 4/2008 | Brassfield et al. |
| 2008/0131285 A1 | 6/2008 | Albert et al. |
| 2008/0135718 A1 | 6/2008 | Lee et al. |
| 2008/0138208 A1 | 6/2008 | Walters |
| 2008/0138209 A1 | 6/2008 | Cunha et al. |
| 2008/0145235 A1 | 6/2008 | Cunha et al. |
| 2008/0169412 A1 | 7/2008 | Snyder et al. |
| 2008/0190582 A1 | 8/2008 | Lee et al. |
| 2009/0041587 A1 | 2/2009 | Konter et al. |
| 2009/0095435 A1 | 4/2009 | Luczak et al. |
| 2009/0181560 A1 | 7/2009 | Cherian |
| 2009/0255742 A1 | 10/2009 | Hansen |
| 2010/0021643 A1 | 1/2010 | Lane et al. |
| 2010/0150733 A1 | 6/2010 | Abdel-Messeh et al. |
| 2010/0200189 A1 | 8/2010 | Qi et al. |
| 2010/0219325 A1 | 9/2010 | Bullied et al. |
| 2010/0276103 A1 | 11/2010 | Bullied et al. |
| 2010/0304064 A1 | 12/2010 | Huttner |
| 2011/0048665 A1 | 3/2011 | Schlienger et al. |
| 2011/0068077 A1 | 3/2011 | Smyth |
| 2011/0132563 A1 | 6/2011 | Merrill et al. |
| 2011/0132564 A1 | 6/2011 | Merrill et al. |
| 2011/0135446 A1 | 6/2011 | Dube et al. |
| 2011/0146075 A1 | 6/2011 | Hazel et al. |
| 2011/0150666 A1 | 6/2011 | Hazel et al. |
| 2011/0189440 A1 | 8/2011 | Appleby et al. |
| 2011/0236221 A1 | 9/2011 | Campbell |
| 2011/0240245 A1 | 10/2011 | Schlienger et al. |
| 2011/0250078 A1 | 10/2011 | Bruce et al. |
| 2011/0250385 A1 | 10/2011 | Sypeck et al. |
| 2011/0293434 A1 | 12/2011 | Lee et al. |
| 2011/0315337 A1 | 12/2011 | Piggush |
| 2012/0161498 A1 | 6/2012 | Hansen |
| 2012/0163995 A1 | 6/2012 | Wardle et al. |
| 2012/0168108 A1 | 7/2012 | Farris et al. |
| 2012/0183412 A1 | 7/2012 | Lacy et al. |
| 2012/0186681 A1 | 7/2012 | Sun et al. |
| 2012/0186768 A1 | 7/2012 | Sun et al. |
| 2012/0193841 A1 | 8/2012 | Wang et al. |
| 2012/0237786 A1 | 9/2012 | Morrison et al. |
| 2012/0276361 A1 | 11/2012 | James et al. |
| 2012/0298321 A1 | 11/2012 | Smyth |
| 2013/0019604 A1 | 1/2013 | Cunha et al. |
| 2013/0025287 A1 | 1/2013 | Cunha |
| 2013/0025288 A1 | 1/2013 | Cunha et al. |
| 2013/0064676 A1 | 3/2013 | Salisbury et al. |
| 2013/0139990 A1 | 6/2013 | Appleby et al. |
| 2013/0177448 A1 | 7/2013 | Spangler |
| 2013/0220571 A1 | 8/2013 | Mueller et al. |
| 2013/0266816 A1 | 10/2013 | Xu |
| 2013/0280093 A1 | 10/2013 | Zelesky et al. |
| 2013/0318771 A1 | 12/2013 | Luczak et al. |
| 2013/0323033 A1 | 12/2013 | Lutjen et al. |
| 2013/0327602 A1 | 12/2013 | Barber et al. |
| 2013/0333855 A1 | 12/2013 | Merrill et al. |
| 2013/0338267 A1 | 12/2013 | Appleby et al. |
| 2014/0023497 A1 | 1/2014 | Giglio et al. |
| 2014/0031458 A1 | 1/2014 | Jansen |
| 2014/0033736 A1 | 2/2014 | Propheter-Hinckley et al. |
| 2014/0068939 A1 | 3/2014 | Devine, II et al. |
| 2014/0076857 A1 | 3/2014 | Hu et al. |
| 2014/0076868 A1 | 3/2014 | Hu et al. |
| 2014/0093387 A1 | 4/2014 | Pointon et al. |
| 2014/0140860 A1 | 5/2014 | Tibbott et al. |
| 2014/0169981 A1 | 6/2014 | Bales et al. |
| 2014/0199177 A1 | 7/2014 | Propheter-Hinckley et al. |
| 2014/0202650 A1 | 7/2014 | Song et al. |
| 2014/0284016 A1 | 9/2014 | Vander Wal |
| 2014/0311315 A1 | 10/2014 | Isaac |
| 2014/0314581 A1 | 10/2014 | McBrien et al. |
| 2014/0342175 A1 | 11/2014 | Morrison et al. |
| 2014/0342176 A1 | 11/2014 | Appleby et al. |
| 2014/0356560 A1 | 12/2014 | Prete et al. |
| 2014/0363305 A1 | 12/2014 | Shah et al. |
| 2015/0053365 A1 | 2/2015 | Mueller et al. |
| 2015/0174653 A1 | 6/2015 | Verner et al. |
| 2015/0184857 A1 | 7/2015 | Cunha et al. |
| 2015/0306657 A1 | 10/2015 | Frank |

FOREIGN PATENT DOCUMENTS

| | | |
|---|---|---|
| EP | 0025481 B1 | 2/1983 |
| EP | 0111600 A1 | 6/1984 |
| EP | 0190114 A1 | 8/1986 |
| EP | 0319244 A2 | 6/1989 |
| EP | 0324229 A2 | 7/1989 |
| EP | 0324229 B1 | 7/1992 |
| EP | 0539317 A1 | 4/1993 |
| EP | 0556946 A1 | 8/1993 |
| EP | 0559251 A1 | 9/1993 |
| EP | 0585183 A1 | 3/1994 |
| EP | 0319244 B1 | 5/1994 |
| EP | 0661246 A1 | 7/1995 |
| EP | 0539317 B1 | 11/1995 |
| EP | 0715913 A1 | 6/1996 |
| EP | 0725606 A1 | 8/1996 |
| EP | 0750956 A2 | 1/1997 |
| EP | 0750957 A1 | 1/1997 |
| EP | 0792409 A1 | 9/1997 |
| EP | 0691894 B1 | 10/1997 |
| EP | 0805729 A2 | 11/1997 |
| EP | 0818256 A1 | 1/1998 |
| EP | 0556946 B1 | 4/1998 |
| EP | 0559251 B1 | 12/1998 |
| EP | 0585183 B1 | 3/1999 |
| EP | 0899039 A2 | 3/1999 |
| EP | 0750956 B1 | 5/1999 |
| EP | 0661246 B1 | 9/1999 |
| EP | 0725606 B1 | 12/1999 |
| EP | 0968062 A1 | 1/2000 |
| EP | 0805729 B1 | 8/2000 |
| EP | 1055800 A2 | 11/2000 |
| EP | 1070829 A2 | 1/2001 |
| EP | 1124509 A1 | 8/2001 |
| EP | 1142658 A1 | 10/2001 |
| EP | 1161307 A1 | 12/2001 |
| EP | 1163970 A1 | 12/2001 |
| EP | 1178769 A1 | 2/2002 |
| EP | 0715913 B1 | 4/2002 |
| EP | 0968062 B1 | 5/2002 |
| EP | 0951579 B1 | 1/2003 |
| EP | 1284338 A2 | 2/2003 |
| EP | 0750957 B1 | 3/2003 |
| EP | 1341481 A2 | 9/2003 |
| EP | 1358958 A1 | 11/2003 |
| EP | 1367224 A1 | 12/2003 |
| EP | 0818256 B1 | 2/2004 |
| EP | 1124509 B1 | 3/2004 |
| EP | 1425483 A2 | 6/2004 |
| EP | 1055800 B1 | 10/2004 |
| EP | 1163970 B1 | 3/2005 |
| EP | 1358958 B1 | 3/2005 |

(56) References Cited

FOREIGN PATENT DOCUMENTS

| | | |
|---|---|---|
| EP | 1519116 A1 | 3/2005 |
| EP | 1531019 A1 | 5/2005 |
| EP | 0899039 B1 | 11/2005 |
| EP | 1604753 A1 | 12/2005 |
| EP | 1659264 A2 | 5/2006 |
| EP | 1178769 B1 | 7/2006 |
| EP | 1382403 B1 | 9/2006 |
| EP | 1759788 A2 | 3/2007 |
| EP | 1764171 A1 | 3/2007 |
| EP | 1813775 A2 | 8/2007 |
| EP | 1815923 A1 | 8/2007 |
| EP | 1849965 A2 | 10/2007 |
| EP | 1070829 B1 | 1/2008 |
| EP | 1142658 B1 | 3/2008 |
| EP | 1927414 A2 | 6/2008 |
| EP | 1930097 A1 | 6/2008 |
| EP | 1930098 A1 | 6/2008 |
| EP | 1930099 A1 | 6/2008 |
| EP | 1932604 A1 | 6/2008 |
| EP | 1936118 A2 | 6/2008 |
| EP | 1939400 A2 | 7/2008 |
| EP | 1984162 A1 | 10/2008 |
| EP | 1604753 B1 | 11/2008 |
| EP | 2000234 A2 | 12/2008 |
| EP | 2025869 A1 | 2/2009 |
| EP | 1531019 B1 | 3/2010 |
| EP | 2212040 A1 | 8/2010 |
| EP | 2246133 A1 | 11/2010 |
| EP | 2025869 B1 | 12/2010 |
| EP | 2335845 A1 | 6/2011 |
| EP | 2336493 A2 | 6/2011 |
| EP | 2336494 A2 | 6/2011 |
| EP | 1930097 B1 | 7/2011 |
| EP | 2362822 A2 | 9/2011 |
| EP | 2366476 A1 | 9/2011 |
| EP | 2392774 A1 | 12/2011 |
| EP | 1930098 B1 | 2/2012 |
| EP | 2445668 A2 | 5/2012 |
| EP | 2445669 A2 | 5/2012 |
| EP | 2461922 A1 | 6/2012 |
| EP | 1659264 B1 | 11/2012 |
| EP | 2519367 A2 | 11/2012 |
| EP | 2537606 A1 | 12/2012 |
| EP | 1927414 B1 | 1/2013 |
| EP | 2549186 A2 | 1/2013 |
| EP | 2551592 A2 | 1/2013 |
| EP | 2551593 A2 | 1/2013 |
| EP | 2559533 A2 | 2/2013 |
| EP | 2559534 A2 | 2/2013 |
| EP | 2559535 A2 | 2/2013 |
| EP | 2576099 A1 | 4/2013 |
| EP | 2000234 B1 | 7/2013 |
| EP | 2614902 A2 | 7/2013 |
| EP | 2650062 A2 | 10/2013 |
| EP | 2246133 B1 | 7/2014 |
| EP | 2366476 B1 | 7/2014 |
| EP | 2777841 A1 | 9/2014 |
| EP | 1849965 B1 | 2/2015 |
| EP | 2834031 A2 | 2/2015 |
| EP | 1341481 B1 | 3/2015 |
| EP | 2841710 A1 | 3/2015 |
| EP | 2855857 A2 | 4/2015 |
| EP | 2880276 A1 | 6/2015 |
| EP | 2937161 A1 | 10/2015 |
| GB | 731292 A | 6/1955 | |
| GB | 800228 A | 8/1958 | |
| GB | 2102317 A | 2/1983 | |
| GB | 2118078 A | 10/1983 | |
| JP | 5-330957 A | * 12/1993 | ............... B22C 9/10 |
| JP | H1052731 A | 2/1998 | |
| WO | 9615866 A1 | 5/1996 | |
| WO | 9618022 A1 | 6/1996 | |
| WO | 2010036801 A2 | 4/2010 | |
| WO | 2010040746 A1 | 4/2010 | |
| WO | 2010151833 A2 | 12/2010 | |
| WO | 2010151838 A2 | 12/2010 | |
| WO | 2011019667 A1 | 2/2011 | |
| WO | 2013163020 A1 | 10/2013 | |
| WO | 2014011262 A2 | 1/2014 | |
| WO | 2014022255 A1 | 2/2014 | |
| WO | 2014028095 A2 | 2/2014 | |
| WO | 2014093826 A2 | 6/2014 | |
| WO | 2014105108 A1 | 7/2014 | |
| WO | 2014109819 A1 | 7/2014 | |
| WO | 2014133635 A2 | 9/2014 | |
| WO | 2014179381 A1 | 11/2014 | |
| WO | 2015006026 A1 | 1/2015 | |
| WO | 2015006440 A1 | 1/2015 | |
| WO | 2015006479 A1 | 1/2015 | |
| WO | 2015009448 A1 | 1/2015 | |
| WO | 2015042089 A1 | 3/2015 | |
| WO | 2015050987 A1 | 4/2015 | |
| WO | 2015053833 A1 | 4/2015 | |
| WO | 2015073068 A1 | 5/2015 | |
| WO | 2015073657 A1 | 5/2015 | |
| WO | 2015080854 A1 | 6/2015 | |
| WO | 2015094636 A1 | 6/2015 | |

OTHER PUBLICATIONS

Liu et al, "Effect of nickel coating on bending properties of stereolithography photo-polymer SL5195", Materials & Design, vol. 26, Issue 6, pp. 493-496, 2005.

European Search Report and Opinion issued in connection with related EP Application No. 16202422.8 dated May 8, 2017.

European Search Report and Opinion issued in connection with related EP Application No. 16204602.3 dated May 12, 2017.

European Search Report and Opinion issued in connection with related EP Application No. 16204609.8 dated May 12, 2017.

European Search Report and Opinion issued in connection with related EP Application No. 16204610.6 dated May 17, 2017.

European Search Report and Opinion issued in connection with related EP Application No. 16204613.0 dated May 22, 2017.

European Search Report and Opinion issued in connection with related EP Application No. 16204605.6 dated May 26, 2017.

European Search Report and Opinion issued in connection with related EP Application No. 16204607.2 dated May 26, 2017.

European Search Report and Opinion issued in connection with corresponding EP Application No. 16204608.0 dated May 26, 2017.

European Search Report and Opinion issued in connection with related EP Application No. 16204617.1 dated May 26, 2017.

European Search Report and Opinion issued in connection with related EP Application No. 16204614.8.0 dated Jun. 2, 2017.

European Search Report and Opinion issued in connection with related EP Application No. 17168418.6 dated Aug. 10, 2017.

Extended EP Search Report for related application 16204610.6 dated May 17, 2017 (5 pgs).

* cited by examiner

METHOD AND ASSEMBLY FOR FORMING COMPONENTS HAVING INTERNAL PASSAGES USING A JACKETED CORE

BACKGROUND

The field of the disclosure relates generally to components having an internal passage defined therein, and more particularly to forming such components using a jacketed core.

Some components require an internal passage to be defined therein, for example, in order to perform an intended function. For example, but not by way of limitation, some components, such as hot gas path components of gas turbines, are subjected to high temperatures. At least some such components have internal passages defined therein to receive a flow of a cooling fluid, such that the components are better able to withstand the high temperatures. For another example, but not by way of limitation, some components are subjected to friction at an interface with another component. At least some such components have internal passages defined therein to receive a flow of a lubricant to facilitate reducing the friction.

At least some known components having an internal passage defined therein are formed in a mold, with a core of ceramic material extending within the mold cavity at a location selected for the internal passage. After a molten metal alloy is introduced into the mold cavity around the ceramic core and cooled to form the component, the ceramic core is removed, such as by chemical leaching, to form the internal passage. However, at least some known ceramic cores are fragile, resulting in cores that are difficult and expensive to produce and handle without damage. In addition, some molds used to form such components are formed by investment casting, and at least some known ceramic cores lack sufficient strength to reliably withstand injection of a material, such as, but not limited to, wax, used to form a pattern for the investment casting process.

Alternatively or additionally, at least some known components having an internal passage defined therein are initially formed without the internal passage, and the internal passage is formed in a subsequent process. For example, at least some known internal passages are formed by drilling the passage into the component, such as, but not limited to, using an electrochemical drilling process. However, at least some such drilling processes are relatively time-consuming and expensive. Moreover, at least some such drilling processes cannot produce an internal passage curvature required for certain component designs.

BRIEF DESCRIPTION

In one aspect, a method of forming a component having an internal passage defined therein is provided. The method includes forming a precursor core having a shape corresponding to a shape of the internal passage, and forming a hollow structure around an outer wall of the precursor core. The method also includes removing the precursor core from within the hollow structure, and disposing an inner core within the hollow structure such that the hollow structure and the inner core form a jacketed core. The method further includes positioning the jacketed core with respect to a mold, and introducing a component material in a molten state into a cavity of the mold, such that the component material in the molten state at least partially absorbs the hollow structure from a portion of the jacketed core within the cavity. Additionally, the method includes cooling the component material in the cavity to form the component. The inner core defines the internal passage within the component.

DRAWINGS

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The exemplary components and methods described herein overcome at least some of the disadvantages associated with known assemblies and methods for forming a component having an internal passage defined therein. The embodiments described herein include forming a precursor core corresponding to a shape of the internal passage, and forming a hollow structure around the precursor core. The precursor core is removed from within the hollow structure, and an inner core is disposed therein to form a jacketed core. The jacketed core is positioned with respect to a mold, and the component is cast in the mold. Component material in the molten state at least partially absorbs the hollow structure from a portion of the jacketed core, and the inner core defines the internal passage within the component.

Figure 1:
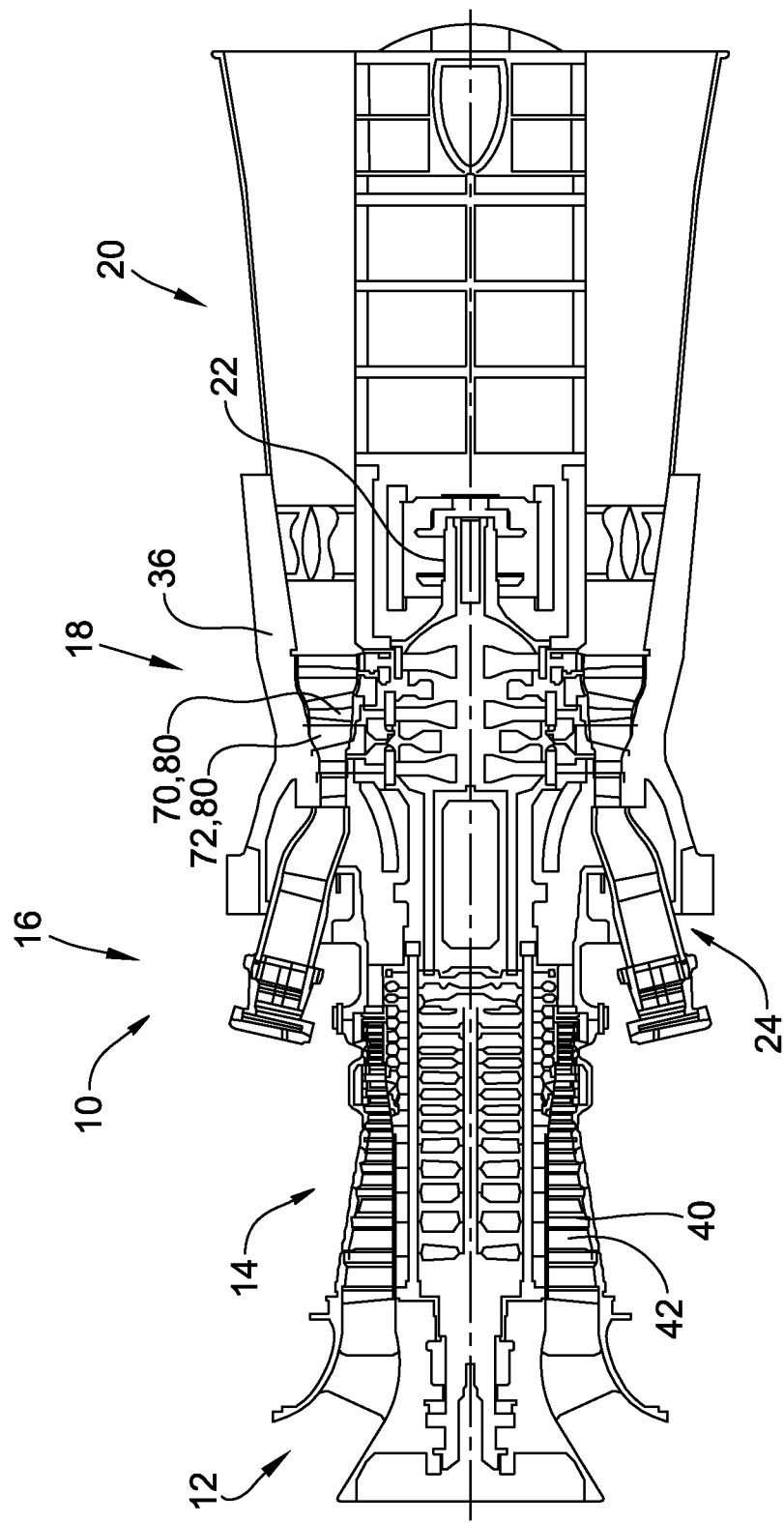
FIG. 1 is a schematic diagram of an exemplary rotary machine.

FIG. 1 is a schematic view of an exemplary rotary machine 10 having components for which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any rotary machine for which components formed with internal passages as described herein are suitable. Moreover, although embodiments of the present disclosure are described in the context of a rotary machine for purposes of illustration, it should be understood that the embodiments described herein are applicable in any context that involves a component suitably formed with an internal passage defined therein.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. Components of rotary machine 10 are designated as components 80. Components 80 proximate a path of the combustion gases are subjected to high temperatures during operation of rotary machine 10. Additionally or alternatively, components 80 include any component suitably formed with an internal passage defined therein.

Figure 2:
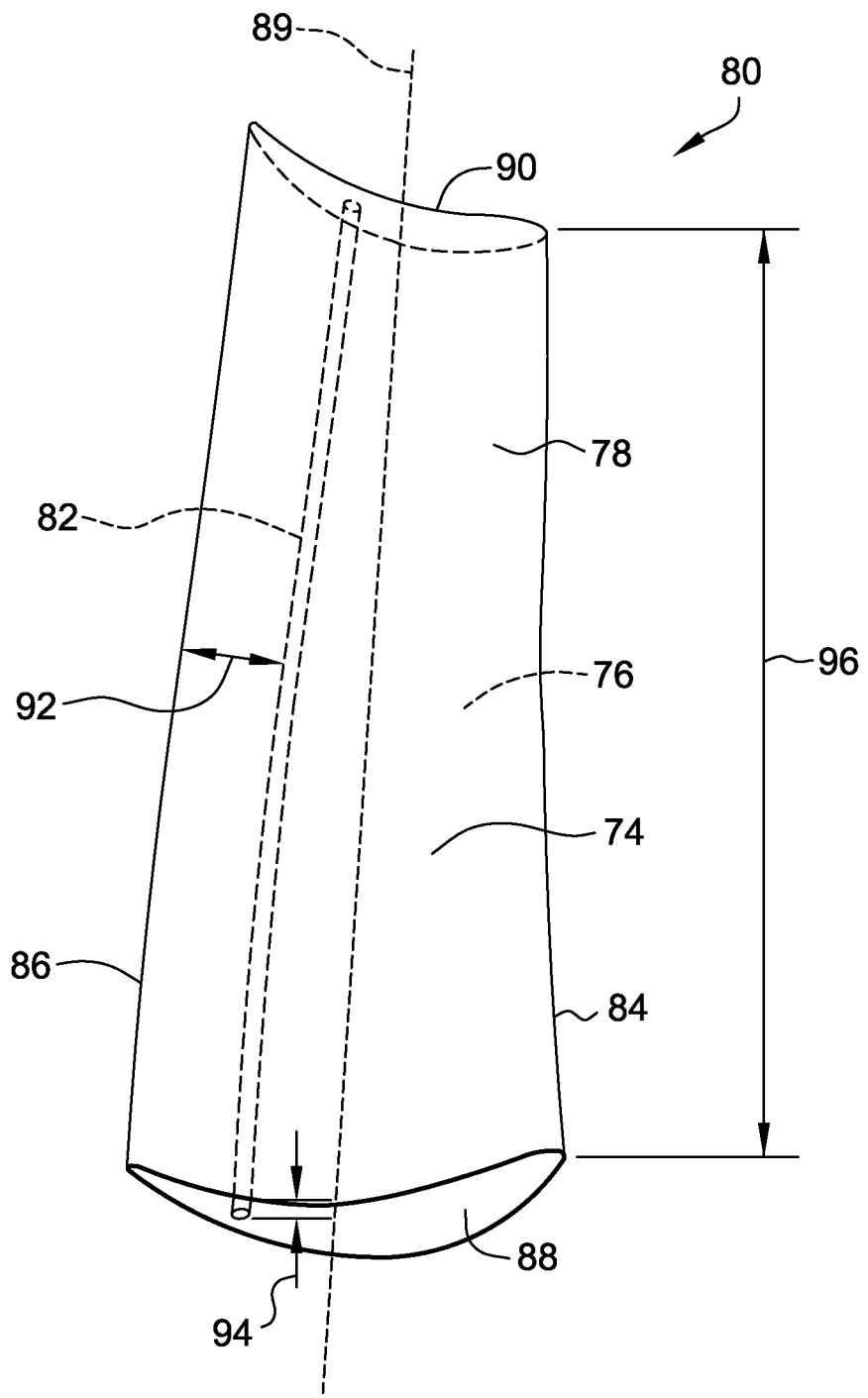
FIG. 2 is a schematic perspective view of an exemplary component for use with the rotary machine shown in FIG. 1.

FIG. 2 is a schematic perspective view of an exemplary component 80, illustrated for use with rotary machine 10 (shown in FIG. 1). Component 80 includes at least one internal passage 82 defined therein. For example, a cooling fluid is provided to internal passage 82 during operation of rotary machine 10 to facilitate maintaining component 80 below a temperature of the hot combustion gases. Although only one internal passage 82 is illustrated, it should be understood that component 80 includes any suitable number of internal passages 82 formed as described herein.

Component 80 is formed from a component material 78. In the exemplary embodiment, component material 78 is a suitable nickel-based superalloy. In alternative embodiments, component material 78 is at least one of a cobalt-based superalloy, an iron-based alloy, and a titanium-based alloy. In other alternative embodiments, component material 78 is any suitable material that enables component 80 to be formed as described herein.

In the exemplary embodiment, component 80 is one of rotor blades 70 or stator vanes 72. In alternative embodiments, component 80 is another suitable component of rotary machine 10 that is capable of being formed with an internal passage as described herein. In still other embodiments, component 80 is any component for any suitable application that is suitably formed with an internal passage defined therein.

In the exemplary embodiment, rotor blade 70, or alternatively stator vane 72, includes a pressure side 74 and an opposite suction side 76. Each of pressure side 74 and suction side 76 extends from a leading edge 84 to an opposite trailing edge 86. In addition, rotor blade 70, or alternatively stator vane 72, extends from a root end 88 to an opposite tip end 90, defining a blade length 96. In alternative embodiments, rotor blade 70, or alternatively stator vane 72, has any suitable configuration that is capable of being formed with an internal passage as described herein.

In certain embodiments, blade length 96 is at least about 25.4 centimeters (cm) (10 inches). Moreover, in some embodiments, blade length 96 is at least about 50.8 cm (20 inches). In particular embodiments, blade length 96 is in a range from about 61 cm (24 inches) to about 101.6 cm (40 inches). In alternative embodiments, blade length 96 is less than about 25.4 cm (10 inches). For example, in some embodiments, blade length 96 is in a range from about 2.54 cm (1 inch) to about 25.4 cm (10 inches). In other alternative embodiments, blade length 96 is greater than about 101.6 cm (40 inches).

In the exemplary embodiment, internal passage 82 extends from root end 88 to tip end 90. In alternative embodiments, internal passage 82 extends within component 80 in any suitable fashion, and to any suitable extent, that enables internal passage 82 to be formed as described herein. In certain embodiments, internal passage 82 is nonlinear. For example, component 80 is formed with a predefined twist along an axis 89 defined between root end 88 and tip end 90, and internal passage 82 has a curved shape complementary to the axial twist. In some embodiments, internal passage 82 is positioned at a substantially constant distance 94 from pressure side 74 along a length of internal passage 82. Alternatively or additionally, a chord of component 80 tapers between root end 88 and tip end 90, and internal passage 82 extends nonlinearly complementary to the taper, such that internal passage 82 is positioned at a substantially constant distance 92 from trailing edge 86 along the length of internal passage 82. In alternative embodiments, internal passage 82 has a nonlinear shape that is complementary to any suitable contour of component 80. In other alternative embodiments, internal passage 82 is nonlinear and other than complementary to a contour of component 80. In some embodiments, internal passage 82 having a nonlinear shape facilitates satisfying a preselected cooling criterion for component 80. In alternative embodiments, internal passage 82 extends linearly.

In some embodiments, internal passage 82 has a substantially circular cross-section. In alternative embodiments, internal passage 82 has a substantially ovoid cross-section. In other alternative embodiments, internal passage 82 has any suitably shaped cross-section that enables internal passage 82 to be formed as described herein. Moreover, in certain embodiments, the shape of the cross-section of internal passage 82 is substantially constant along a length of internal passage 82. In alternative embodiments, the shape of the cross-section of internal passage 82 varies along a length of internal passage 82 in any suitable fashion that enables internal passage 82 to be formed as described herein.

Figure 3:
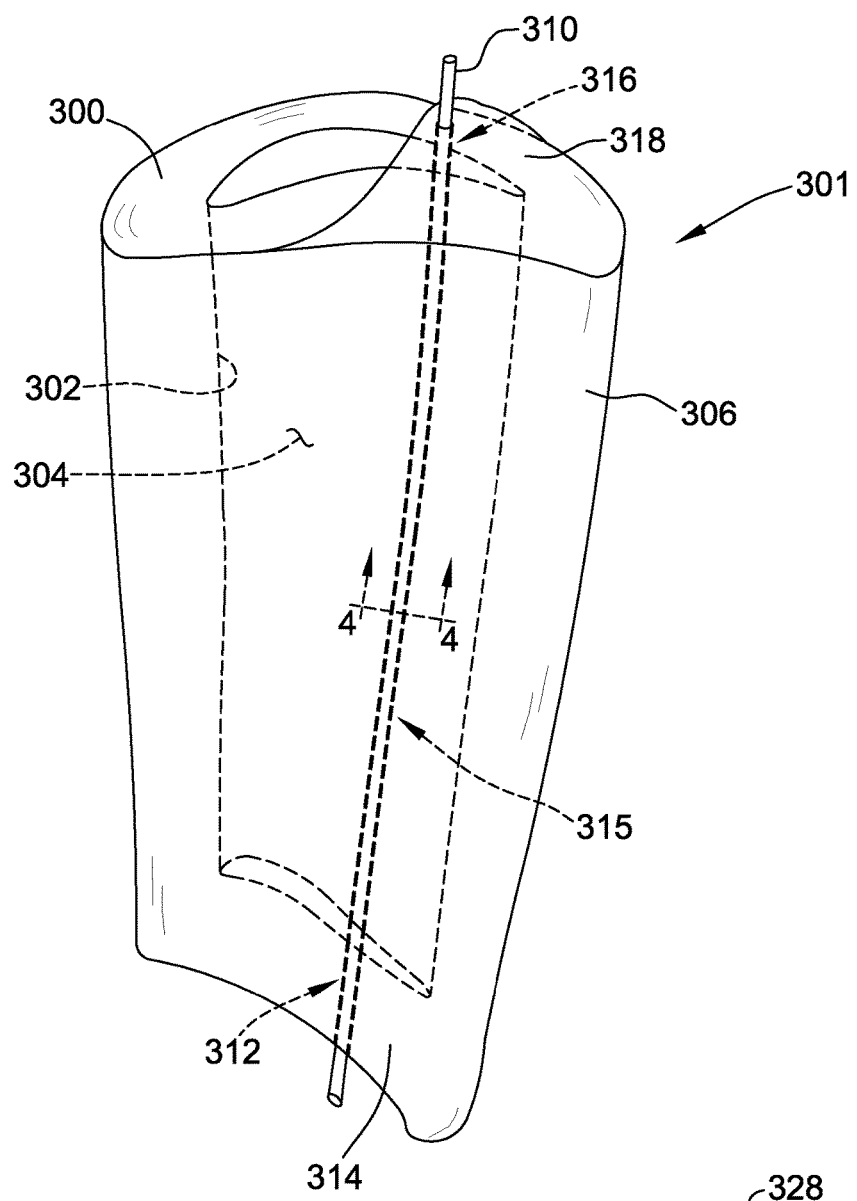
FIG. 3 is a schematic perspective view of an exemplary mold assembly for making the component shown in FIG. 2, the mold assembly including a jacketed core positioned with respect to a mold.
Figure 4:
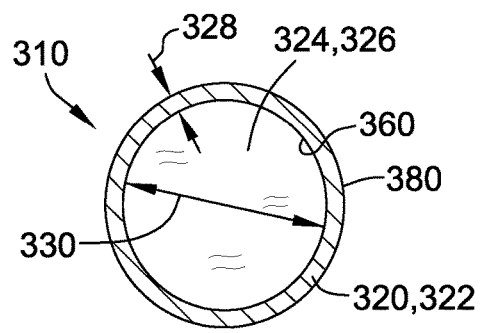
FIG. 4 is a schematic cross-section of an exemplary jacketed core for use with the mold assembly shown in FIG. 3, taken along lines 4-4 shown in FIG. 3.

FIG. 3 is a schematic perspective view of a mold assembly 301 for making component 80 (shown in FIG. 2). Mold assembly 301 includes a jacketed core 310 positioned with respect to a mold 300. FIG. 4 is a schematic cross-section of jacketed core 310 taken along lines 4-4 shown in FIG. 3. With reference to FIGS. 2-4, an interior wall 302 of mold 300 defines a mold cavity 304. Interior wall 302 defines a shape corresponding to an exterior shape of component 80, such that component material 78 in a molten state can be introduced into mold cavity 304 and cooled to form component 80. It should be recalled that, although component 80 in the exemplary embodiment is rotor blade 70, or alternatively stator vane 72, in alternative embodiments component 80 is any component suitably formable with an internal passage defined therein, as described herein.

Jacketed core 310 is positioned with respect to mold 300 such that a portion 315 of jacketed core 310 extends within mold cavity 304. Jacketed core 310 includes a hollow structure 320 formed from a first material 322, and an inner core 324 disposed within hollow structure 320 and formed from an inner core material 326. Inner core 324 is shaped to define a shape of internal passage 82, and inner core 324 of portion 315 of jacketed core 310 positioned within mold cavity 304 defines internal passage 82 within component 80 when component 80 is formed.

Hollow structure 320 includes an outer wall 380 that substantially encloses inner core 324 along a length of inner core 324. An interior portion 360 of hollow structure 320 is located interiorly with respect to outer wall 380, such that inner core 324 is complementarily shaped by interior portion 360 of hollow structure 320. In certain embodiments, hollow structure 320 defines a generally tubular shape. For example, but not by way of limitation, hollow structure 320 is implemented as a tube that is suitably disposed in a nonlinear shape, such as a curved or angled shape, as necessary to define a selected nonlinear shape of inner core 324 and, thus, of internal passage 82. In alternative embodiments, hollow structure 320 defines any suitable shape that enables inner core 324 to define a shape of internal passage 82 as described herein.

In the exemplary embodiment, hollow structure 320 has a wall thickness 328 that is less than a characteristic width 330 of inner core 324. Characteristic width 330 is defined herein as the diameter of a circle having the same cross-sectional area as inner core 324. In alternative embodiments, hollow structure 320 has a wall thickness 328 that is other than less than characteristic width 330. A shape of a cross-section of inner core 324 is circular in the exemplary embodiment shown in FIGS. 3 and 4. Alternatively, the shape of the cross-section of inner core 324 corresponds to any suitable shape of the cross-section of internal passage 82 that enables internal passage 82 to function as described herein.

Mold 300 is formed from a mold material 306. In the exemplary embodiment, mold material 306 is a refractory ceramic material selected to withstand a high temperature environment associated with the molten state of component material 78 used to form component 80. In alternative embodiments, mold material 306 is any suitable material that enables component 80 to be formed as described herein. Moreover, in the exemplary embodiment, mold 300 is formed by a suitable investment casting process. For example, but not by way of limitation, a suitable pattern material, such as wax, is injected into a suitable pattern die to form a pattern (not shown) of component 80, the pattern is repeatedly dipped into a slurry of mold material 306 which is allowed to harden to create a shell of mold material 306, and the shell is dewaxed and fired to form mold 300. In alternative embodiments, mold 300 is formed by any suitable method that enables mold 300 to function as described herein.

In certain embodiments, jacketed core 310 is secured relative to mold 300 such that jacketed core 310 remains fixed relative to mold 300 during a process of forming component 80. For example, jacketed core 310 is secured such that a position of jacketed core 310 does not shift during introduction of molten component material 78 into mold cavity 304 surrounding jacketed core 310. In some embodiments, jacketed core 310 is coupled directly to mold 300. For example, in the exemplary embodiment, a tip portion 312 of jacketed core 310 is rigidly encased in a tip portion 314 of mold 300. Additionally or alternatively, a root portion 316 of jacketed core 310 is rigidly encased in a root portion 318 of mold 300 opposite tip portion 314. For example, but not by way of limitation, mold 300 is formed by investment casting as described above, and jacketed core 310 is securely coupled to the suitable pattern die such that tip portion 312 and root portion 316 extend out of the pattern die, while portion 315 extends within a cavity of the die. The pattern material is injected into the die around jacketed core 310 such that portion 315 extends within the pattern. The investment casting causes mold 300 to encase tip portion 312 and/or root portion 316. Additionally or alternatively, jacketed core 310 is secured relative to mold 300 in any other suitable fashion that enables the position of jacketed core 310 relative to mold 300 to remain fixed during a process of forming component 80.

First material 322 is selected to be at least partially absorbable by molten component material 78. In certain embodiments, component material 78 is an alloy, and first material 322 is at least one constituent material of the alloy. Moreover, in some embodiments, first material 322 includes a plurality of materials disposed between interior portion 360 and outer wall 380 in successive layers, as will be described herein.

For example, in the exemplary embodiment, component material 78 is a nickel-based superalloy, and first material 322 is substantially nickel, such that first material 322 is substantially absorbable by component material 78 when component material 78 in the molten state is introduced into mold cavity 304. In alternative embodiments, component material 78 is any suitable alloy, and first material 322 is at least one material that is at least partially absorbable by the molten alloy. For example, component material 78 is a cobalt-based superalloy, and first material 322 is substantially cobalt. For another example, component material 78 is an iron-based alloy, and first material 322 is substantially iron. For another example, component material 78 is a titanium-based alloy, and first material 322 is substantially titanium.

In certain embodiments, wall thickness 328 is sufficiently thin such that first material 322 of portion 315 of jacketed core 310, that is, the portion that extends within mold cavity 304, is substantially absorbed by component material 78 when component material 78 in the molten state is introduced into mold cavity 304. For example, in some such embodiments, first material 322 is substantially absorbed by component material 78 such that no discrete boundary delineates hollow structure 320 from component material 78 after component material 78 is cooled. Moreover, in some such embodiments, first material 322 is substantially absorbed such that, after component material 78 is cooled, first material 322 is substantially uniformly distributed within component material 78. For example, a concentration of first material 322 proximate inner core 324 is not detectably higher than a concentration of first material 322 at other locations within component 80. For example, and without limitation, first material 322 is nickel and component material 78 is a nickel-based superalloy, and no detectable higher nickel concentration remains proximate inner core 324 after component material 78 is cooled, resulting in a distribution of nickel that is substantially uniform throughout the nickel-based superalloy of formed component 80.

In alternative embodiments, wall thickness 328 is selected such that first material 322 is other than substantially absorbed by component material 78. For example, in some embodiments, after component material 78 is cooled, first material 322 is other than substantially uniformly distributed within component material 78. For example, a concentration of first material 322 proximate inner core 324 is detectably higher than a concentration of first material 322 at other locations within component 80. In some such embodiments, first material 322 is partially absorbed by component material 78 such that a discrete boundary delineates hollow structure 320 from component material 78 after component material 78 is cooled. Moreover, in some such embodiments, first material 322 is partially absorbed by component material 78 such that at least a portion of hollow structure 320 proximate inner core 324 remains intact after component material 78 is cooled.

For example, in certain embodiments, such as, but not limited to, embodiments in which component 80 is rotor blade 70, characteristic width 330 of inner core 324 is within a range from about 0.050 cm (0.020 inches) to about 1.016 cm (0.400 inches), and wall thickness 328 of hollow structure 320 is selected to be within a range from about 0.013 cm (0.005 inches) to about 0.254 cm (0.100 inches). More particularly, in some such embodiments, characteristic width 330 is within a range from about 0.102 cm (0.040 inches) to about 0.508 cm (0.200 inches), and wall thickness 328 is selected to be within a range from about 0.013 cm (0.005 inches) to about 0.038 cm (0.015 inches). For another example, in some embodiments, such as, but not limited to, embodiments in which component 80 is a stationary component, such as but not limited to stator vane 72, characteristic width 330 of inner core 324 greater than about 1.016 cm (0.400 inches), and/or wall thickness 328 is selected to be greater than about 0.254 cm (0.100 inches). In alternative embodiments, characteristic width 330 is any suitable value that enables the resulting internal passage 82 to perform its intended function, and wall thickness 328 is selected to be any suitable value that enables jacketed core 310 to function as described herein.

In the exemplary embodiment, inner core material 326 is a refractory ceramic material selected to withstand a high temperature environment associated with the molten state of component material 78 used to form component 80. For example, but without limitation, inner core material 326 includes at least one of silica, alumina, and mullite. Moreover, in the exemplary embodiment, inner core material 326 is selectively removable from component 80 to form internal passage 82. For example, but not by way of limitation, inner core material 326 is removable from component 80 by a suitable process that does not substantially degrade component material 78, such as, but not limited to, a suitable chemical leaching process. In certain embodiments, inner core material 326 is selected based on a compatibility with, and/or a removability from, component material 78. In alternative embodiments, inner core material 326 is any suitable material that enables component 80 to be formed as described herein.

Figure 5:
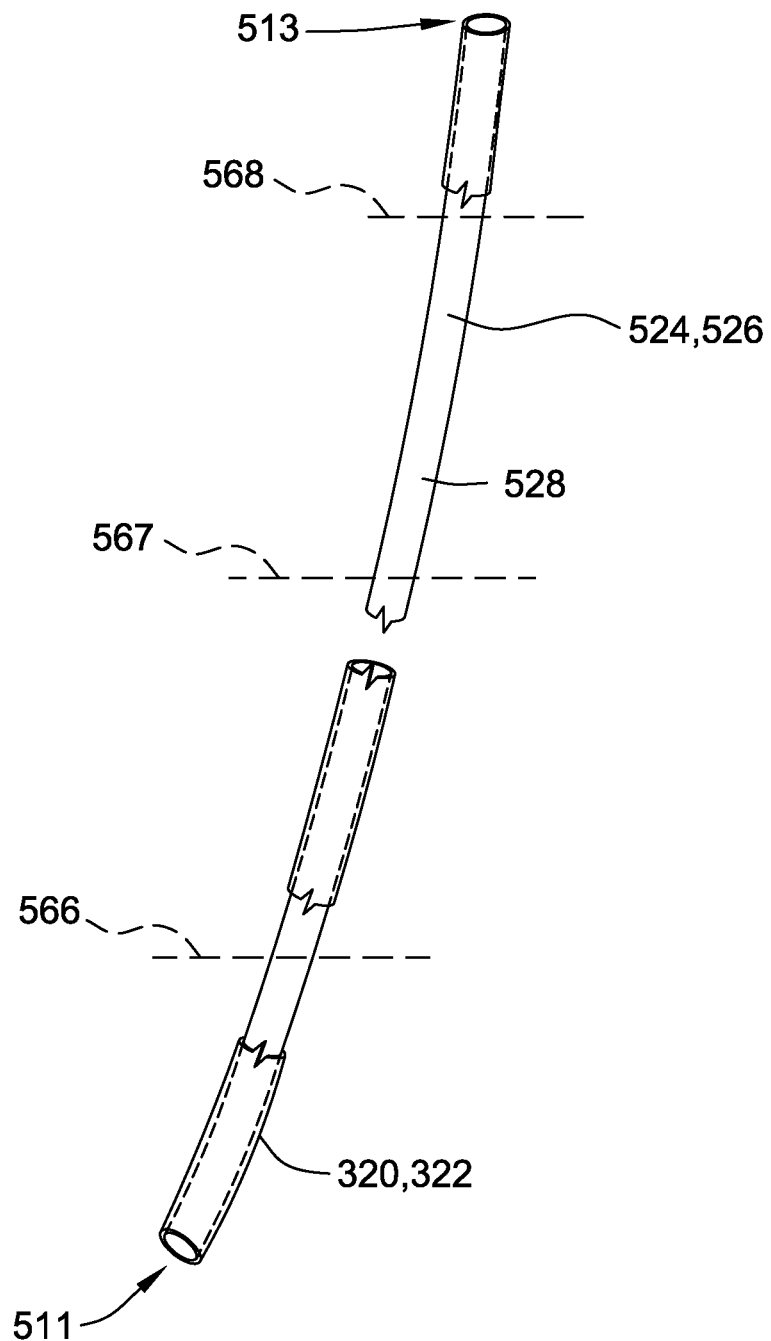
FIG. 5 is a schematic perspective cutaway view of an exemplary hollow structure of the jacketed core shown in FIGS. 3 and 4 formed around an exemplary precursor core.

FIG. 5 is a schematic perspective cutaway view of hollow structure 320 formed around an exemplary precursor core 524. Precursor core 524 is formed from a precursor material 526. With reference to FIGS. 2-5, precursor core 524 has a shape corresponding to a shape of internal passage 82. Hollow structure 320 is formed around an outer wall 528 of precursor core 524, such that interior portion 360 of hollow structure 320 is complementarily shaped by outer wall 528. Although hollow structure 320 is illustrated in cutaway view as extending over only a portion of precursor core 524, in the exemplary embodiment, hollow structure 320 extends over substantially all of a portion of precursor core 524 that defines internal passage 82. After hollow structure 320 is formed around outer wall 528, precursor core 524 is removed from within hollow structure 320, and inner core 324 is disposed within hollow structure 320 to form jacketed core 310. Inner core 324 is complementarily shaped by interior portion 360, such that inner core 324 also has a shape corresponding to the shape of internal passage 82, such that inner core 324 of portion 315 of jacketed core 310 positioned within mold cavity 304 defines the position of internal passage 82 within component 80, as described above.

In some embodiments, precursor core 524 is formed at least partially using a suitable additive manufacturing process, and precursor material 526 is selected to facilitate additive manufacture of precursor core 524. For example, a computer design model of precursor core 524 is sliced into a series of thin, parallel planes between a first end 511 and a second end 513 of precursor core 524. A computer numerically controlled (CNC) machine deposits successive layers of precursor material 526 from first end 511 to second end 513 in accordance with the model slices to form precursor core 524. Three such representative layers are indicated as layers 566, 567, and 568. In some such embodiments, precursor material 526 is selected to be a photopolymer, and the successive layers of precursor material 526 are deposited using a stereolithographic process. Alternatively, precursor material 526 is selected to be a thermoplastic, and the successive layers of precursor material 526 are deposited using at least one of a fused filament fabrication process, an inkjet/powder bed process, a selective heat sintering process, and a selective laser sintering process. Additionally or alternatively, precursor material 526 is selected to be any suitable material, and the successive layers of precursor material 526 are deposited using any suitable process that enables precursor core 524 to be formed as described herein.

In certain embodiments, the formation of precursor core 524 by an additive manufacturing process enables precursor core 524 to be formed with a nonlinearity, structural intricacy, precision, and/or repeatability that is not achievable by other methods. Accordingly, the formation of precursor core 524 by an additive manufacturing process enables the complementary formation of interior portion 360 of hollow structure 320, inner core 324, and thus of nonlinear internal passage 82, with a correspondingly increased nonlinearity, structural intricacy, precision, and/or repeatability. Additionally or alternatively, the formation of precursor core 524 using an additive manufacturing process enables the formation of internal passages 82 that could not be reliably added to component 80 in a separate process after initial formation of component 80 in mold 300, as discussed above. Moreover, in some embodiments, the formation of precursor core 524 by an additive manufacturing process using precursor material 526 that is a photopolymer or thermoplastic decreases a cost and/or a time required for manufacture of hollow structure 320, as compared to forming hollow structure 320 directly by additive manufacture using a metallic first material 322.

In alternative embodiments, precursor core 524 is formed in any suitable fashion that enables hollow structure 320 to be formed around outer wall 528 as described herein.

In certain embodiments, precursor material 526 is further selected to facilitate removal of precursor core 524 from within hollow structure 320. In some such embodiments, precursor material 526 is selected to have a melting point that is less than a melting point of first material 322. For example, a temperature of hollow structure 320 formed around precursor core 524 is raised above the melting point of precursor material 526, such that precursor core 524 is melted and drained out of hollow structure 320. Additionally or alternatively, precursor material 526 is selected to be a softer material than first material 322, and precursor core 524 is machined out of hollow structure 320. For example, a mechanical rooter device is snaked into hollow structure 320 to break up and/or dislodge precursor material 526 to facilitate removal of precursor core 524. Additionally or alternatively, precursor material 526 is selected to be compatible with a chemical removal process, and precursor core 524 is removed from hollow structure 320 using a suitable solvent.

In alternative embodiments, precursor material 526 is any suitable material that enables precursor core 524 to be removed from within hollow structure 320 in any suitable fashion.

In some embodiments, hollow structure 320 is formed around outer wall 528 of precursor core 524 by a plating process, such that first material 322 is deposited around outer wall 528 until the selected wall thickness 328 of hollow structure 320 is achieved. For example, first material 322 is a metal, and is deposited around outer wall 528 in a suitable metal plating process. In some such embodiments, first material 322 is deposited around outer wall 528 in an electroless plating process. Additionally or alternatively, first material 322 is deposited around outer wall 528 in an electroplating process. In alternative embodiments, first material 322 is any suitable material, and hollow structure 320 is formed around outer wall 528 of precursor core 524 by any suitable plating process that enables hollow structure 320 to function as described herein.

In certain embodiments, first material 322 includes a plurality of materials disposed between interior portion 360 and outer wall 380 in successive layers. For example, precursor material 526 is a thermoplastic, an initial layer of first material 322 is a first metal alloy selected to facilitate electroless plating deposition onto precursor material 526 around outer wall 528, and a subsequent layer of first material 322 is a second metal alloy selected to facilitate electroplating to the prior layer of first material 322. In some such embodiments, each of the first and second metal alloys are alloys of nickel. In other embodiments, precursor material 526 is any suitable material, first material 322 is any suitable plurality of materials, and hollow structure 320 is formed around outer wall 528 of precursor core 524 by any suitable process that enables hollow structure 320 to function as described herein.

After hollow structure 320 is formed, precursor core 524 is removed from within hollow structure 320, as described above. In some embodiments, jacketed core 310 is formed by filling hollow structure 320 with inner core material 326. For example, but not by way of limitation, inner core material 326 is injected as a slurry into hollow structure 320, and inner core material 326 is dried within hollow structure 320 to form inner core 324 within jacketed core 310. Moreover, in certain embodiments, hollow structure 320 substantially structurally reinforces inner core 324, thus reducing potential problems that would be associated with production, handling, and use of an unreinforced inner core 324 to form component 80 in some embodiments. For example, in certain embodiments, inner core 324 is a relatively brittle ceramic material subject to a relatively high risk of fracture, cracking, and/or other damage. Thus, in some such embodiments, forming and transporting jacketed core 310 presents a much lower risk of damage to inner core 324, as compared to using an unjacketed inner core 324. Similarly, in some such embodiments, forming a suitable pattern around jacketed core 310 to be used for investment casting of mold 300, such as by injecting a wax pattern material into a pattern die around jacketed core 310, presents a much lower risk of damage to inner core 324, as compared to using an unjacketed inner core 324. Thus, in certain embodiments, use of jacketed core 310 presents a much lower risk of failure to produce an acceptable component 80 having internal passage 82 defined therein, as compared to the same steps if performed using an unjacketed inner core 324 rather than jacketed core 310. Thus, jacketed core 310 facilitates obtaining advantages associated with positioning inner core 324 with respect to mold 300 to define internal passage 82, while reducing or eliminating fragility problems associated with inner core 324.

Figure 6:
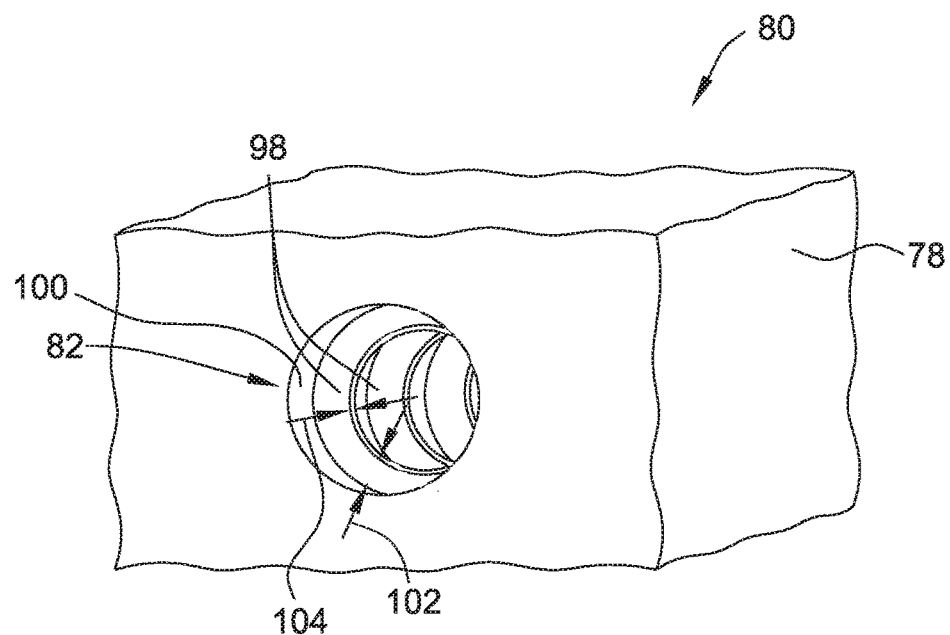
FIG. 6 is a schematic perspective view of a portion of another exemplary component for use with the rotary machine shown in FIG. 1, the component including an internal passage having a plurality of passage wall features.
Figure 7:
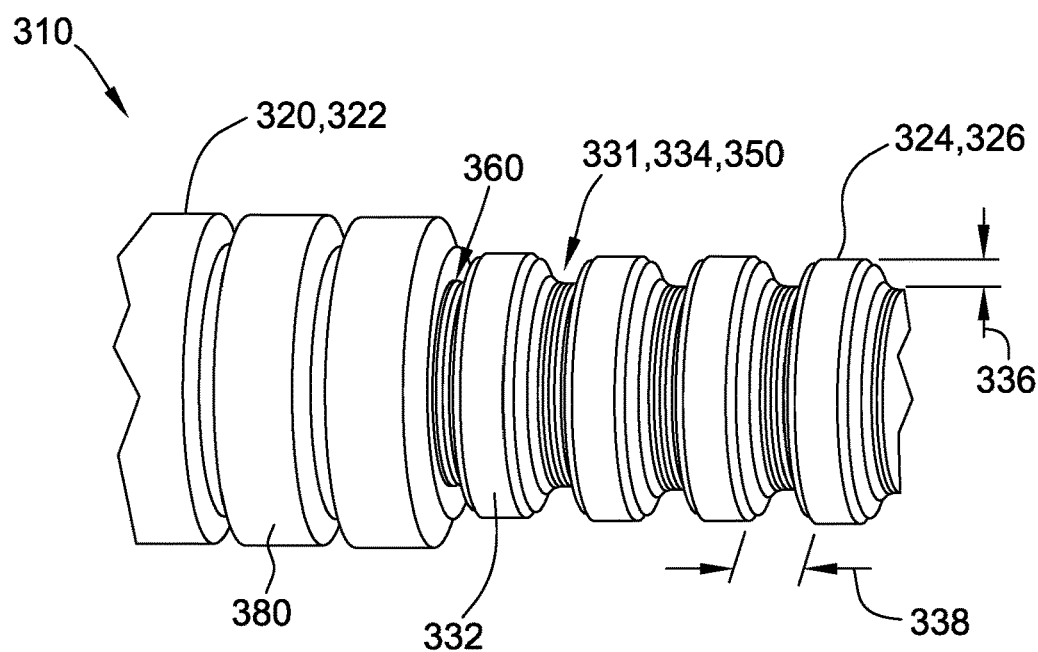
FIG. 7 is a schematic perspective cutaway view of another exemplary jacketed core for use with the mold assembly shown in FIG. 3 to form the component having passage wall features as shown in FIG. 6.
Figure 8:
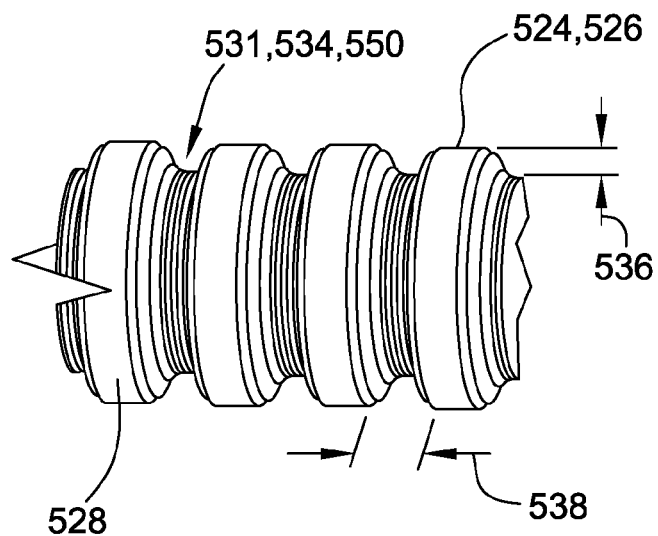
FIG. 8 is a schematic perspective view of another exemplary precursor core for use in forming the jacketed core shown in FIG. 7.

FIG. 6 is a schematic perspective view of a portion of another exemplary component 80 that includes internal passage 82 having a plurality of passage wall features 98. For example, but not by way of limitation, passage wall features 98 are turbulators that improve a heat transfer capability of a cooling fluid provided to internal passage 82 during operation of rotary machine 10. FIG. 7 is a schematic perspective cutaway view of another exemplary jacketed core 310 for use in mold assembly 301 to form component 80 having passage wall features 98 as shown in FIG. 6. In particular, a portion of hollow structure 320 is cut away in the view of FIG. 7 to illustrate features of inner core 324. FIG. 8 is a schematic perspective view of another exemplary precursor core 524 used to form jacketed core 310 shown in FIG. 7.

With reference to FIGS. 6-8, as discussed above, the shape of inner core 324 defines the shape of internal passage 82. In certain embodiments, inner core 324 is complementarily shaped by interior portion 360 of hollow structure 320 such that inner core 324 defines internal passage 82 including at least one passage wall feature 98 defined therein. For example, inner core 324 is complementarily shaped by interior portion 360 to include at least one complementary feature 331, and the at least one complementary feature 331 has a shape complementary to a shape of at least one passage wall feature 98. Thus, when molten component material 78 is introduced into mold cavity 304 (shown in FIG. 3) surrounding jacketed core 310 and first material 322 is absorbed into molten component material 78, component material 78 in the molten state couples against the at least one complementary feature 331 to form the at least one passage wall feature 98. Additionally or alternatively, to an extent that a portion of interior portion 360 of hollow structure 320 adjacent inner core 324 remains intact after molten component material 78 is introduced into mold cavity 304 and cooled, the intact portion of interior portion 360 coupled against the at least one complementary feature 331 defines the at least one passage wall feature 98.

For example, in the illustrated embodiment, the at least one complementary feature 331 is a plurality of recessed features 334 defined in an exterior surface 332 of inner core 324. Each recessed feature 334 has a shape complementary to a shape of a corresponding passage wall feature 98, such that when molten component material 78 is introduced into mold cavity 304 and first material 322 is absorbed into molten component material 78, molten component material 78 fills the plurality of recessed features 334. Cooled component material 78 within recessed features 334 forms the plurality of passage wall features 98 after inner core 324 is removed, such as, but not limited to, by using a chemical leaching process. For example, each recessed feature 334 is a groove 350 defined with a depth 336 and a width 338, and each corresponding passage wall feature 98 is formed as a ridge extending interiorly from interior wall 100, with a ridge height 102 substantially equal to depth 336 and a ridge width 104 substantially equal to width 338. Thus, exterior surface 332 defines a general shape of interior wall 100, and complementary features 331 of inner core 324 define a shape of passage wall features 98 of internal passage 82.

In the exemplary embodiment precursor core 524 is used to form hollow structure 320. More specifically, in the exemplary embodiment, hollow structure 320 is formed around precursor core 524 by a suitable plating process, such that first material 322 is deposited around outer wall 528 until the selected wall thickness 328 of hollow structure 320 is achieved, as described above. In alternative embodiments, hollow structure 320 is formed around precursor core 524 in any suitable fashion that enables hollow structure 320 to function as described herein.

Precursor core 524 again has a shape corresponding to a shape of internal passage 82. More specifically, precursor core 524 includes at least one complementary feature 531 that has a shape complementary to a shape of at least one passage wall feature 98. For example, in the exemplary embodiment, the at least one complementary feature 531 is a plurality of recessed features 534 defined along outer wall 528 of precursor core 524. Each recessed feature 534 has a shape complementary to a shape of a corresponding passage wall feature 98, such that when hollow structure is formed around outer wall 528, interior portion 360 of hollow structure 320 conforms to the at least one complementary feature 531, that is, to the plurality of recessed features 534 in the exemplary embodiment. In turn, after precursor core 524 is removed from within hollow structure 320, and inner core 324 is disposed within hollow structure 320 to form jacketed core 310, interior portion 360 of hollow structure 320 shapes recessed features 334 of inner core 324, as described above. For example, each recessed feature 534 is a groove 550 defined with a depth 536 and a width 538 corresponding to depth 336 and width 338 of grooves 350 of inner core 324.

In some embodiments, precursor core 524 is formed at least partially using a suitable additive manufacturing process, as described above, and precursor material 526 again is selected to facilitate additive manufacture of precursor core 524. Additionally or alternatively, precursor material 526 is selected to be any suitable material, and the successive layers of precursor material 526 are deposited using any suitable process that enables precursor core 524 to be formed as described herein. In certain embodiments, the formation of precursor core 524 by an additive manufacturing process enables interior portion 360 of hollow structure 320, and thus passage wall features 98 of internal passage 82, to be formed with a structural intricacy, precision, and/or repeatability that is not achievable by other methods. Accordingly, the formation of precursor core 524 by an additive manufacturing process enables the complementary formation of interior portion 360 of hollow structure 320, inner core 324, and thus of passage wall features 98, with a correspondingly increased structural intricacy, precision, and/or repeatability. Additionally or alternatively, the formation of precursor core 524 using an additive manufacturing process enables the formation of passage wall features 98 that could not be reliably added to internal passages 82 in a separate process after initial formation of component 80 in mold 300, as discussed above. Moreover, in some embodiments, the formation of precursor core 524 by an additive manufacturing process using precursor material 526 that is a photopolymer or thermoplastic decreases a cost and/or a time required for manufacture of hollow structure 320, as compared to forming hollow structure 320 directly by additive manufacture using a metallic first material 322.

In alternative embodiments, precursor core 524 is formed in any suitable fashion that enables hollow structure 320 to be formed around outer wall 528 as described herein.

Again in certain embodiments, precursor material 526 is further selected to facilitate removal of precursor core 524 from within hollow structure 320, as described above.

In some embodiments, the shaping of interior portion 360 of hollow structure 320 by precursor core 524 to define passage wall features 98 during formation of component 80 in mold 300 enables the formation of passage wall features 98 at locations along internal passage 82 that could not be consistently and reliably formed using other methods. For example, inner core material 326 is a relatively brittle ceramic material, and independently shaping a similar, but unjacketed, inner core 324 to define complementary features 331 increases a risk of cracking or fracturing inner core 324. The risk is further increased for an unjacketed inner core 324 having a large length-to-diameter (L/d) ratio and/or a substantially nonlinear shape. For another example, adding passage wall features 98 along a length of internal passage 82 in a subsequent separate process, that is, after component 80 is formed is relatively difficult to achieve with repeatability and precision, and particularly so for internal passages 82 having a large length-to-diameter (L/d) ratio and/or a substantially nonlinear shape.

Although the illustrated embodiment shows recessed features 534 defined solely as grooves 550 along outer wall 528 of precursor core 524, and thus recessed features 334 defined solely as grooves 350 in exterior surface 332 of inner core 324, to define a shape of passage wall features 98, in alternative embodiments, other shapes of complementary features 531 and, thus, complementary features 331, are used to define a shape of passage wall features 98. For example, but not by way of limitation, in certain embodiments (not shown), at least one recessed feature 534 extends at least partially longitudinally and/or obliquely along precursor core 524, forming at least one recessed feature 334 that extends at least partially longitudinally and/or obliquely along inner core 324. For another example, but not by way of limitation, in some embodiments (not shown), at least one recessed feature 534 is a dimple is defined in outer wall 528 to define a corresponding passage wall feature 98 having a stud shape. For another example, but not by way of limitation, in some embodiments (not shown), at least one complementary feature 531 is a stud or other protrusion defined on outer wall 528 to define a corresponding passage wall feature 98 as a dimple or other recessed shape. In alternative embodiments, any suitable shape of outer wall 528 is used to define a corresponding shape of passage wall features 98 that enables internal passage 82 to function for its intended purpose. Moreover, although the illustrated embodiments show precursor core 524 and, thus, inner core 324 as having complementary features 531 and 331, respectively, of a substantially identical repeating shape, it should be understood that precursor core 524 has any suitable combination of differently shaped complementary features 531 that enables precursor core 524, and inner core 324, to function as described herein.

Moreover, although the illustrated embodiments show precursor core 524 and inner core 324 shaped to define internal passage 82 having a generally circular cross-section, in alternative embodiments, precursor core 524 and, thus, inner core 324 are shaped to define internal passage 82 having any suitably shaped cross-section that enables internal passage 82 to function for its intended purpose. In particular, but not by way of limitation, forming jacketed core 310 using precursor core 524 facilitates forming component 80 with internal passage 82 having contoured cross-sectional shapes that conform to a geometry of component 80. Moreover, although the illustrated embodiments show precursor core 524 and, thus, inner core 324 as having a generally constant shape of the cross-section along their respective lengths, it should be understood that precursor core 524 and inner core 324 have any suitable variation in the shape of the cross-section along their lengths that enables precursor core 524 and inner core 324 to function as described herein.

Figure 9:
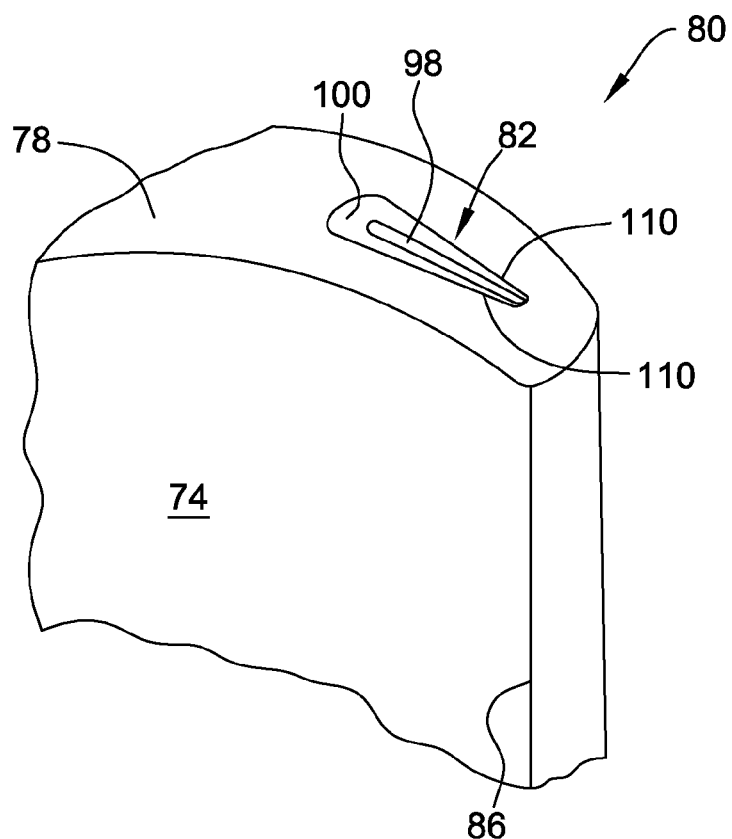
FIG. 9 is a schematic perspective view of a portion of another exemplary component for use with the rotary machine shown in FIG. 1, the component including an internal passage having a contoured cross-section.
Figure 10:
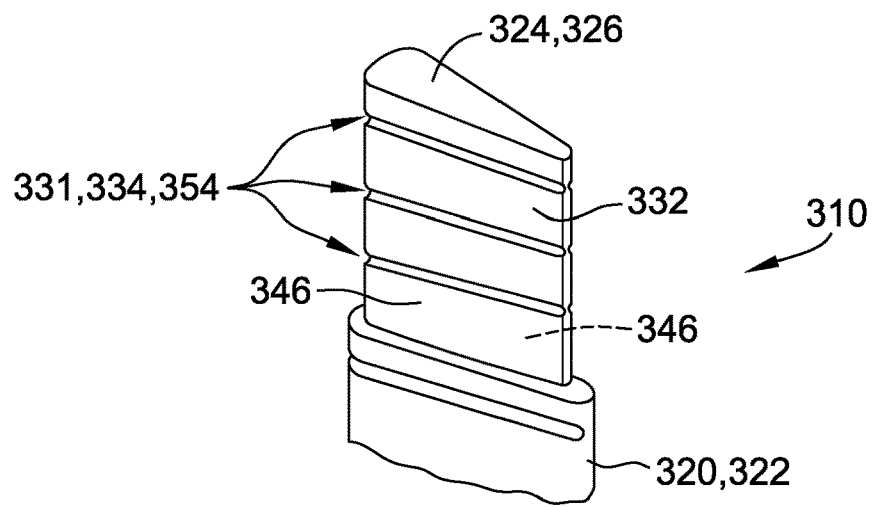
FIG. 10 is a schematic perspective cutaway view of another exemplary jacketed core for use with the mold assembly shown in FIG. 3 to form the component having the internal passage shown in FIG. 9.
Figure 11:
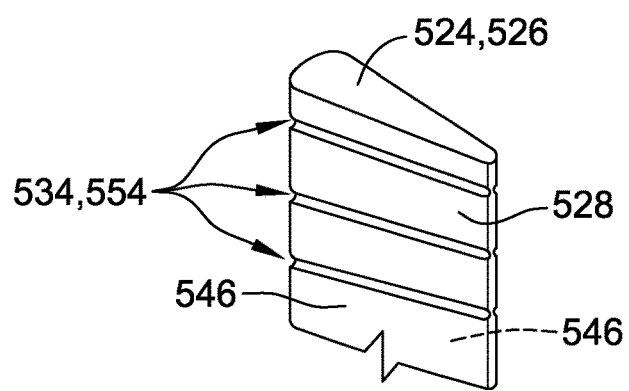
FIG. 11 is a schematic perspective view of another exemplary precursor core for use in forming the jacketed core shown in FIG. 10.

For example, FIG. 9 is a schematic perspective view of a portion of another exemplary component 80 that includes internal passage 82 having a contoured cross-section. FIG. 10 is a schematic perspective cutaway view of another exemplary jacketed core 310 for use with mold assembly 301 to form component 80 having internal passage 82 as shown in FIG. 9. In particular, a portion of hollow structure 320 is cut away in the view of FIG. 10 to illustrate features of inner core 324. FIG. 11 is a schematic perspective view of another exemplary precursor core 524 that may be used to form hollow structure 320 shown in FIG. 10.

With reference to FIGS. 9-11, in the exemplary embodiment, component 80 is one of rotor blade 70 and stator vane 72, and internal passage 82 is defined in component 80 proximate trailing edge 86. More specifically, internal passage 82 is defined by interior wall 100 of component 80 to have a contoured cross-sectional circumference corresponding to a tapered geometry of trailing edge 86. Passage wall features 98 are defined along opposing elongated edges 110 of internal passage 82 to function as turbulators, and extend inward from interior wall 100 towards a center of internal passage 82. Although passage wall features 98 are illustrated as a repeating pattern of elongated ridges each transverse to an axial direction of internal passage 82, it should be understood that in alternative embodiments, passage wall features 98 have any suitable shape, orientation, and/or pattern that enables internal passage 82 to function for its intended purpose.

As discussed above, the shape of exterior surface 332 and recessed features 334 of inner core 324 define the shape of interior wall 100 and passage wall features 98 of internal passage 82. More specifically, inner core 324 has an elongated, tapered cross-section corresponding to the contoured cross-section of internal passage 82. In the exemplary embodiments, the at least one complementary feature 331 is a plurality of recessed features 334 defined as elongated notches 354 in opposing elongated sides 346 of exterior surface 332, and each notch 354 has a shape complementary to a shape of passage wall feature 98, as described above.

In the exemplary embodiment, hollow structure 320 is again formed around precursor core 524 by a suitable plating process, such that first material 322 is deposited around outer wall 528 until the selected wall thickness 328 of hollow structure 320 is achieved, as described above. In alternative embodiments, hollow structure 320 is formed around precursor core 524 in any suitable fashion that enables hollow structure 320 to function as described herein.

Precursor core 524 again has a shape corresponding to a shape of internal passage 82. More specifically, precursor core 524 has an elongated, tapered cross-section corresponding to the contoured cross-section of internal passage 82. In the exemplary embodiments, the at least one complementary feature 531 is a plurality of recessed features 534 defined as elongated notches 554 in opposing elongated sides 546 of outer wall 528, and each notch 554 has a shape complementary to a shape of passage wall feature 98, as described above. Thus, when hollow structure is formed around outer wall 528, interior portion 360 of hollow structure 320 conforms to the plurality of recessed features 534. In turn, after precursor core 524 is removed from within hollow structure 320, and inner core 324 is disposed within hollow structure 320 to form jacketed core 310, interior portion 360 of hollow structure 320 shapes opposing elongated sides 346 of exterior surface 332 and shapes recessed features 334 of inner core 324 as elongated notches 354, as described above.

In some embodiments, precursor core 524 is formed at least partially using a suitable additive manufacturing process, as described above, and precursor material 526 again is selected to facilitate additive manufacture of precursor core 524. Additionally or alternatively, precursor material 526 is selected to be any suitable material, and the successive layers of precursor material 526 are deposited using any suitable process that enables precursor core 524 to be formed as described herein. In certain embodiments, the formation of precursor core 524 by an additive manufacturing process enables interior portion 360 of hollow structure 320, and thus the cross-sectional shape and passage wall features 98 of internal passage 82, to be formed with a structural intricacy, precision, and/or repeatability that is not achievable by other methods. Additionally or alternatively, the formation of precursor core 524 using an additive manufacturing process enables the formation of the cross-sectional shape and passage wall features 98 that could not be reliably added to internal passages 82 in a separate process after initial formation of component 80 in mold 300, as discussed above. Moreover, in some embodiments, the formation of precursor core 524 by an additive manufacturing process using precursor material 526 that is a photopolymer or thermoplastic decreases a cost and/or a time required for manufacture of hollow structure 320, as compared to forming hollow structure 320 directly by additive manufacture using a metallic first material 322.

In alternative embodiments, precursor core 524 is formed in any suitable fashion that enables hollow structure 320 to be formed around outer wall 528 as described herein.

Again in certain embodiments, precursor material 526 is further selected to facilitate removal of precursor core 524 from within hollow structure 320, as described above.

In alternative embodiments, component 80 has any suitable geometry, and precursor core 524 is shaped to form internal passage 82 having any suitable shape that suitably corresponds to the geometry of component 80.

Figure 12:
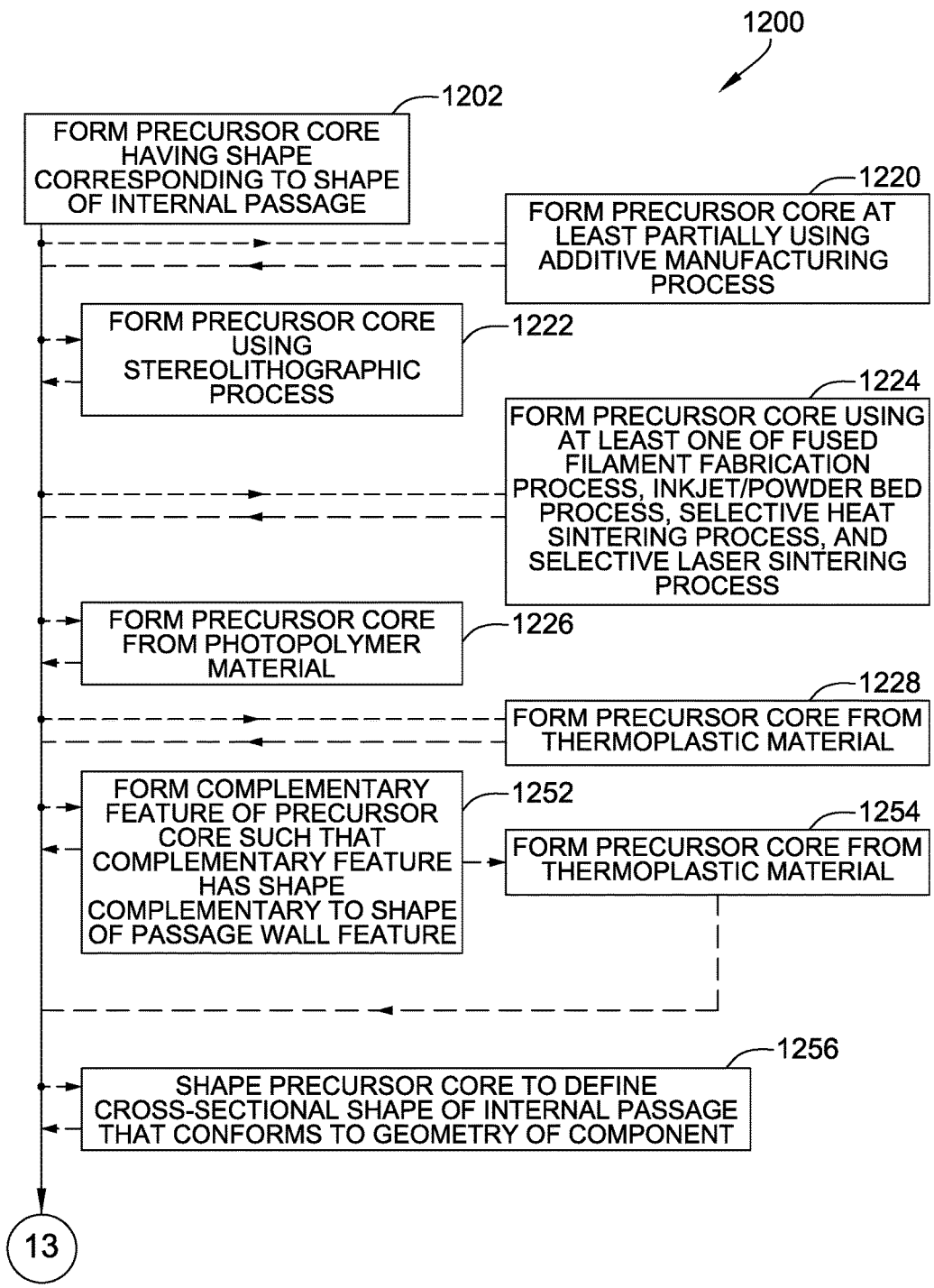
FIG. 12 is a flow diagram of an exemplary method of forming a component having an internal passage defined therein, such as any of the components shown in FIGS. 2, 6, and 9.
Figure 13:
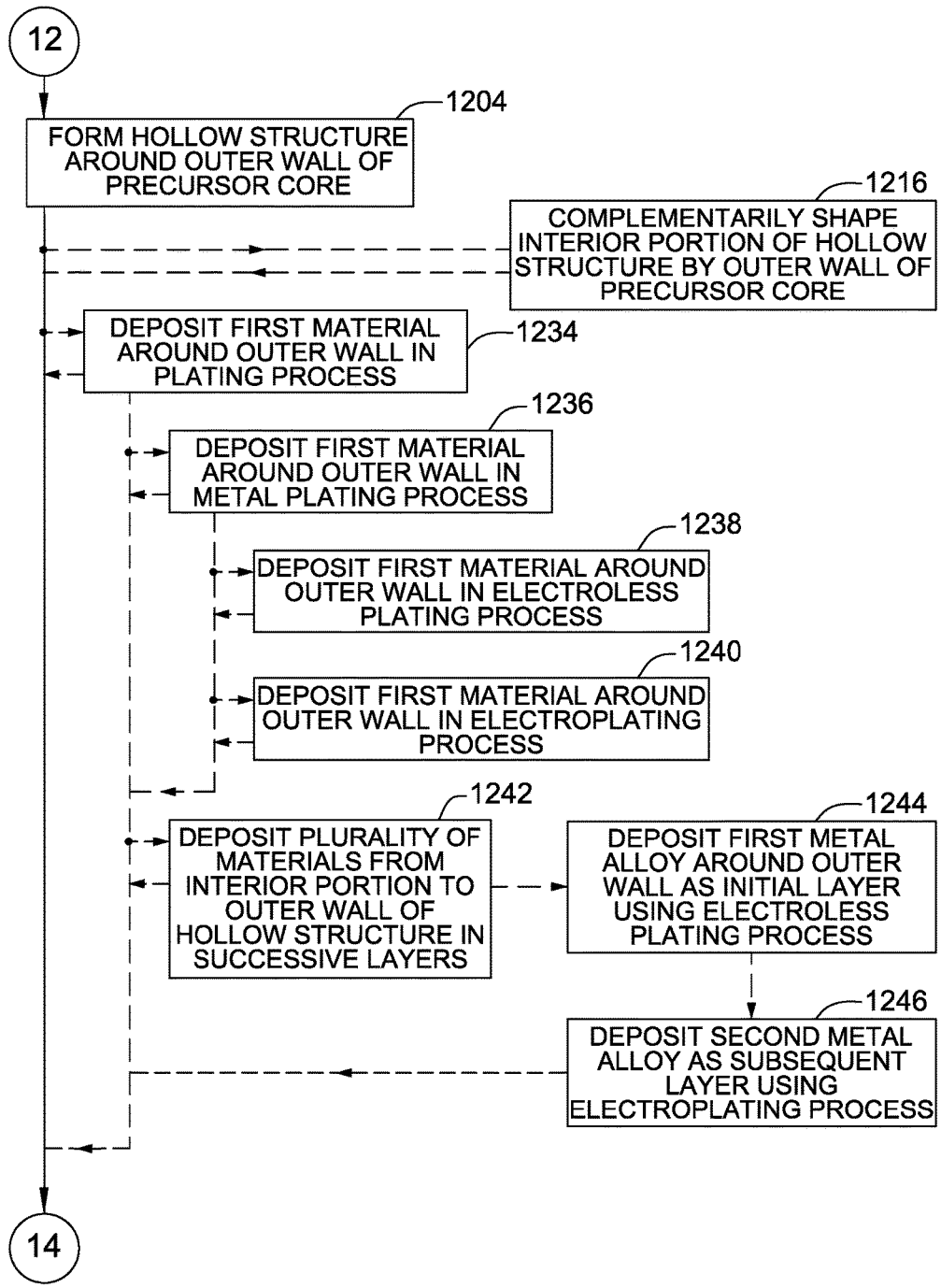
FIG. 13 is a continuation of the flow diagram from FIG. 12.
Figure 14:
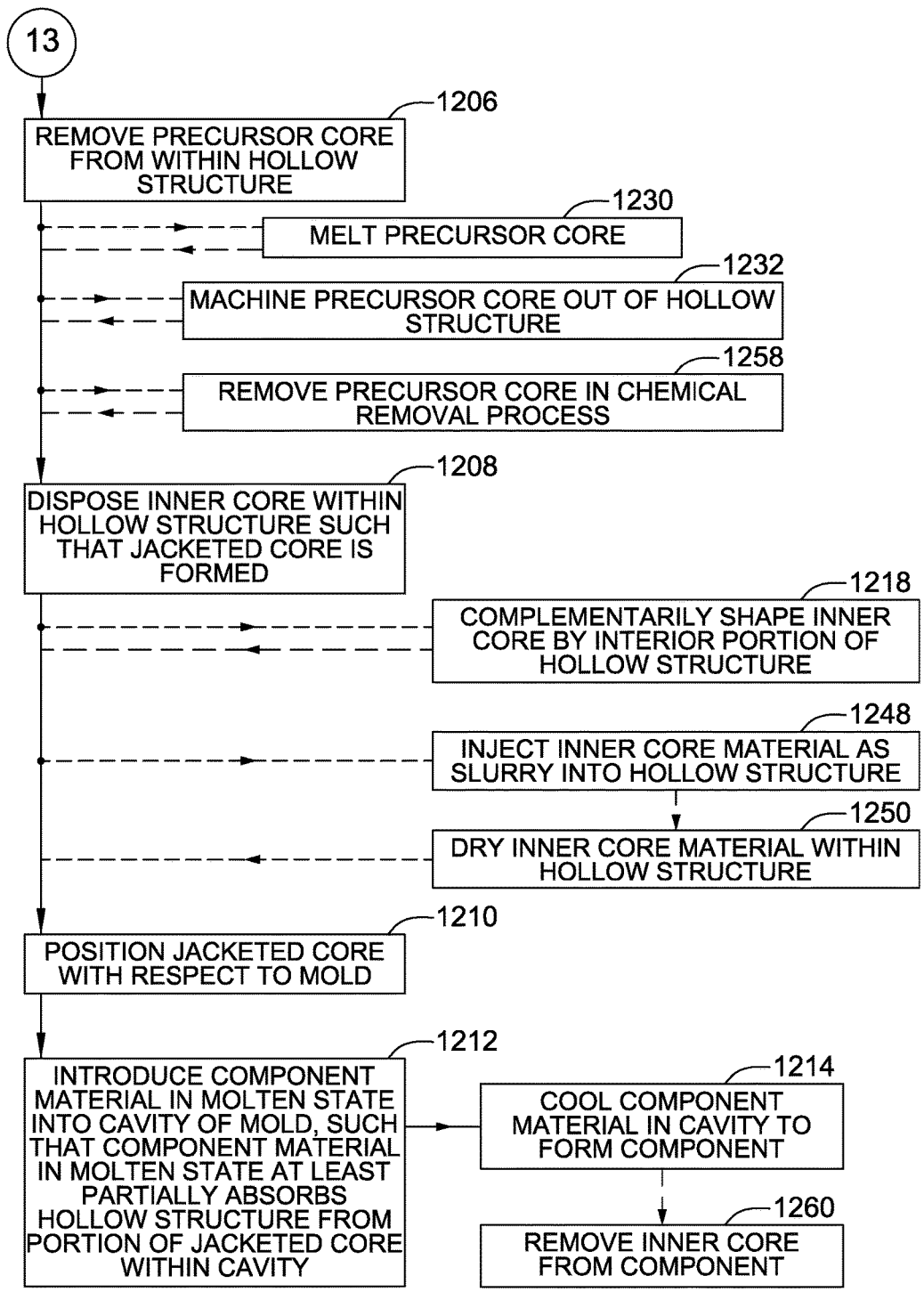
FIG. 14 is a continuation of the flow diagram from FIGS. 12 and 13.

An exemplary method 1200 of forming a component, such as component 80, having an internal passage defined therein, such as internal passage 82, is illustrated in a flow diagram in FIGS. 12-14. With reference also to FIGS. 1-11, exemplary method 1200 includes forming 1202 a precursor core, such as precursor core 524, having a shape corresponding to a shape of the internal passage. Method 1200 also includes forming 1204 a hollow structure, such as hollow structure 320, around an outer wall of the precursor core, such as outer wall 528. Method 1200 further includes removing 1206 the precursor core from within the hollow structure, and disposing 1208 an inner core, such as inner core 324, within the hollow structure such that the hollow structure and the inner core form a jacketed core, such as jacketed core 310. Additionally, method 1200 includes positioning 1210 the jacketed core with respect to a mold, such as mold 300, and introducing 1212 a component material, such as component material 78, in a molten state into a cavity of the mold, such as mold cavity 304, such that the component material in the molten state at least partially absorbs the hollow structure from a portion of the jacketed core within the cavity. Method 1200 also includes cooling 1214 the component material in the cavity to form the component. The inner core defines the internal passage within the component.

In some embodiments, the step of forming 1204 the hollow structure around the outer wall of the precursor core includes complementarily shaping 1216 an interior portion of the hollow structure, such as interior portion 360, by the outer wall of the precursor core.

In some embodiments, the step of disposing 1208 the inner core within the hollow structure includes complementarily shaping 1218 the inner core by an interior portion of the hollow structure, such as interior portion 360, such that the inner core has a shape corresponding to the shape of internal passage.

In certain embodiments, the step of forming 1202 the precursor core includes forming 1220 the precursor core at least partially using an additive manufacturing process. In some such embodiments, the step of forming 1202 the precursor core includes forming 1222 the precursor core using a stereolithographic process. Additionally or alternatively, in some such embodiments, the step of forming 1202 the precursor core includes forming 1224 the precursor core using at least one of a fused filament fabrication process, an inkjet/powder bed process, a selective heat sintering process, and a selective laser sintering process.

In some embodiments, the step of forming 1202 the precursor core includes forming 1226 the precursor core from a photopolymer material. Additionally or alternatively, the step of forming 1202 the precursor core includes forming 1228 the precursor core from a thermoplastic material.

In certain embodiments, the step of removing 1206 the precursor core from within the hollow structure includes melting 1230 the precursor core. Additionally or alternatively, the step of removing 1206 the precursor core from within the hollow structure includes machining 1232 the precursor core out of the hollow structure. Additionally or alternatively, the step of removing 1206 the precursor core from within the hollow structure includes removing 1258 the precursor core from the hollow structure using a chemical removal process.

In some embodiments, the hollow structure is formed from a first material, such as first material 322, and the step of forming 1204 the hollow structure around the outer wall of the precursor core includes depositing 1234 the first material around the outer wall in a plating process. In some such embodiments, the first material is a metallic material, and the step of forming 1204 the hollow structure around the outer wall of the precursor core includes depositing 1236 the first material around the outer wall in a metal plating process. Moreover, in some such embodiments, the step of forming 1204 the hollow structure around the outer wall of the precursor core includes depositing 1238 the first material around the outer wall in an electroless plating process. Additionally or alternatively, in some such embodiments, the step of forming 1204 the hollow structure around the outer wall of the precursor core includes depositing 1240 the first material around the outer wall in an electroplating process. Further, in some such embodiments, the step of forming 1204 the hollow structure around the outer wall of the precursor core includes depositing 1242 a plurality of materials from an interior portion of the hollow structure, such as interior portion 360, to an outer wall of the hollow structure, such as outer wall 380, in successive layers. In some such embodiments, the step of depositing 1242 a plurality of materials includes depositing 1244 a first metal alloy around the outer wall of the precursor core as an initial layer of the plurality of layers using an electroless plating process, and depositing 1246 a second metal alloy as a subsequent layer of the plurality of layers using an electroplating process.

In certain embodiments, the step of disposing 1208 the inner core within the hollow structure includes injecting 1248 an inner core material, such as inner core material 326, as a slurry into the hollow structure, and drying 1250 the inner core material within the hollow structure to form the inner core.

In some embodiments, the internal passage includes at least one passage wall feature, such as passage wall feature 98, and the step of forming 1202 the precursor core includes forming 1252 at least one complementary feature of the precursor core, such as complementary feature 531, such that the at least one complementary feature has a shape complementary to a shape of the at least one passage wall feature. In some such embodiments, the at least one passage wall feature is a ridge extending interiorly from an interior wall of the component, such as interior wall 100, and the step of forming 1252 the at least one complementary feature of the precursor core includes forming 1254 a plurality of recessed features, such as recessed features 534, along the outer wall of the precursor core.

In certain embodiments, the step of forming 1202 the precursor core includes shaping 1256 the precursor core to define a cross-sectional shape of the internal passage that conforms to a geometry of the component.

In certain embodiments, method 1200 further includes removing 1260 the inner core from the component to form the internal passage within the component.

The above-described jacketed core provides a cost-effective method for forming jacketed cores used to form components having internal passages defined therein, especially but not limited to internal passages having nonlinear and/or complex shapes, thus reducing or eliminating fragility problems associated with the core. Specifically, the jacketed core includes a hollow structure and an inner core disposed therein. The hollow core is formed around an outer wall of a precursor core that has a shape corresponding to a shape of the internal passage. The jacketed core is positioned within a mold cavity to define the position of the internal passage within the component. The hollow structure provides structural reinforcement to the inner core, enabling the reliable handling and use of cores that are, for example, but without limitation, longer, heavier, thinner, and/or more complex than conventional cores for forming components having an internal passage defined therein. In some embodiments, the precursor core is formed from a material that enables relatively fast and inexpensive manufacture, such as by an additive manufacturing process, and results in improved structural intricacy, precision, and/or repeatability of the hollow structure formed around the precursor core. In certain embodiments, the hollow structure is formed around the precursor core by a metal plating process.

In addition, forming the jacketed core from the precursor core described herein provides a cost-effective and high-accuracy method to integrally form any of a variety of passage wall features on the walls defining the internal passage. Specifically, the ability to pre-shape the precursor core to complementarily define the hollow structure, and thus to define the exterior surface of the inner core, facilitates adding, for example, turbulator-defining features to the exterior surface of the inner core without mechanically manipulating the hollow structure or inner core, thus avoiding a risk of cracking or other damage.

An exemplary technical effect of the methods, systems, and apparatus described herein includes at least one of: (a) reducing or eliminating fragility problems associated with forming, handling, transport, and/or storage of the core used in forming a component having an internal passage defined therein; (b) enabling the use of longer, heavier, thinner, and/or more complex cores as compared to conventional cores for forming internal passages for components; and (c) reducing or eliminating fragility problems associated with adding features to the exterior surface of the core that complementarily define passage wall features in the component.

Exemplary embodiments of jacketed cores formed from precursor cores are described above in detail. The precursor cores and jacketed cores formed therefrom, and methods and systems using such precursor cores and jacketed cores formed therefrom, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use cores within mold assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a component having an internal passage defined therein, said method comprising:
   forming a precursor core having a shape corresponding to a shape of the internal passage;
   forming a hollow structure of a first material around an outer wall of the precursor core, wherein the first material is metallic;
   removing the precursor core from within the hollow structure;
   subsequent to removal of the precursor core, disposing an inner core within the hollow structure such that the hollow structure and the inner core form a jacketed core;
   positioning the jacketed core with respect to a mold;
   introducing a component material in a molten state into a cavity of the mold, such that the component material in the molten state at least partially absorbs the hollow structure from a portion of the jacketed core within the cavity; and
   cooling the component material in the cavity to form the component, wherein the inner core defines the internal passage within the component.

2. The method of claim 1, wherein forming the hollow structure around the outer wall of the precursor core comprises complementarily shaping an interior portion of the hollow structure by the outer wall of the precursor core.

3. The method of claim 1, wherein disposing the inner core within the hollow structure comprises complementarily shaping the inner core by an interior portion of the hollow structure, such that the inner core has a shape corresponding to the shape of the internal passage.

4. The method of claim 1, wherein forming the precursor core comprises forming the precursor core at least partially using an additive manufacturing process.

5. The method of claim 4, wherein forming the precursor core comprises forming the precursor core using a stereolithographic process.

6. The method of claim 4, wherein forming the precursor core comprises forming the precursor core using at least one of a fused filament fabrication process, an inkjet/powder bed process, a selective heat sintering process, and a selective laser sintering process.

7. The method of claim 1, wherein forming the precursor core comprises forming the precursor core from a photopolymer material.

8. The method of claim 1, wherein forming the precursor core comprises forming the precursor core from a thermoplastic material.

9. The method of claim 1, wherein removing the precursor core from within the hollow structure comprises melting the precursor core.

10. The method of claim 1, wherein removing the precursor core from within the hollow structure comprises machining the precursor core out of the hollow structure.

11. The method of claim 1, wherein removing the precursor core from within the hollow structure comprises removing the precursor core from the hollow structure using a chemical removal process.

12. The method of claim 1, wherein forming the hollow structure around the outer wall of the precursor core comprises depositing the first material around the outer wall in a plating process.

13. The method of claim 12, wherein forming the hollow structure around the outer wall of the precursor core comprises depositing the first material around the outer wall in a metal plating process.

14. The method of claim 13, wherein forming the hollow structure around the outer wall of the precursor core comprises depositing the first material around the outer wall in an electroless plating process.

15. The method of claim 13, wherein forming the hollow structure around the outer wall of the precursor core comprises depositing the first material around the outer wall in an electroplating process.

16. The method of claim 12, wherein forming the hollow structure around the outer wall of the precursor core comprises depositing a plurality of materials from an interior portion of the hollow structure to an outer wall of the hollow structure in successive layers.

17. The method of claim 16, wherein depositing a plurality of materials comprises:
depositing a first metal alloy around the outer wall of the precursor core as an initial layer of the plurality of layers using an electroless plating process; and
depositing a second metal alloy as a subsequent layer of the plurality of layers using an electroplating process.

18. The method of claim 1, wherein disposing the inner core within the hollow structure comprises:
injecting an inner core material as a slurry into the hollow structure; and
drying the inner core material within the hollow structure to form the inner core.

19. The method of claim 1, wherein the internal passage includes at least one passage wall feature, and forming the precursor core comprises forming at least one complementary feature of the precursor core such that the at least one complementary feature has a shape complementary to a shape of the at least one passage wall feature.

20. The method of claim 19, wherein the at least one passage wall feature is a ridge extending interiorly from an interior wall of the component, and forming the at least one complementary feature of the precursor core comprises forming a plurality of recessed features along the outer wall of the precursor core.

21. The method of claim 1, wherein forming the precursor core comprises shaping the precursor core to define a cross-sectional shape of the internal passage that conforms to a geometry of the component.

22. The method of claim 1, further comprising removing the inner core from the component to form the internal passage within the component.

* * * * *